US012209414B2

(12) United States Patent
Kavulak et al.

(10) Patent No.: US 12,209,414 B2
(45) Date of Patent: Jan. 28, 2025

(54) ROOFING SHINGLE AND METHOD OF MANUFACTURING SAME

(71) Applicant: GAF Energy LLC, Parsippany, NJ (US)

(72) Inventors: David Fredric Joel Kavulak, Fremont, CA (US); Richard Perkins, San Jose, CA (US); Alex Sharenko, Berkeley, CA (US); Caleb Cheung, San Jose, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/172,857

(22) Filed: Feb. 22, 2023

(65) Prior Publication Data

US 2023/0265658 A1 Aug. 24, 2023

Related U.S. Application Data

(60) Provisional application No. 63/313,024, filed on Feb. 23, 2022.

(51) Int. Cl.
*E04D 1/28* (2006.01)
*E04D 1/00* (2006.01)
(Continued)

(52) U.S. Cl.
CPC ................. *E04D 1/28* (2013.01); *E04D 1/20* (2013.01); *E04D 1/2963* (2019.08); *H02S 20/25* (2014.12)

(58) Field of Classification Search
CPC ........... E04D 1/28; E04D 1/20; E04D 1/2963; H02S 20/25
See application file for complete search history.

(56) References Cited

U.S. PATENT DOCUMENTS 1,981,467 A 11/1934 Radtke
3,156,497 A 11/1964 Lessard
(Continued)

FOREIGN PATENT DOCUMENTS

CA 2829440 A 5/2019
CH 700095 A2 6/2010
(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Adriana Figueroa
(74) *Attorney, Agent, or Firm* — GREENBERG TRAURIG, LLP

(57) ABSTRACT

A system includes a plurality of roofing shingles having a core layer and a cap layer, with first and second ends of the cap layer offset from respective first and second ends of the core layer. The cap layer includes a first surface and a pattern on the first surface. A side lap extends from the second end of the cap layer to the second end of the core layer and an extended portion is located at the first end of the cap layer. The extended portion of a first one of the roofing shingles overlays the side lap of a second one of the roofing shingles. The system further includes a plurality of photovoltaic modules, each of the plurality of photovoltaic modules include at least one solar cell.

20 Claims, 8 Drawing Sheets

(51) Int. Cl.
*E04D 1/20* (2006.01)
*H02S 20/25* (2014.01)

(56) References Cited

U.S. PATENT DOCUMENTS 3,581,779 A 6/1971 Gilbert, Jr.
3,894,376 A * 7/1975 Shearer ..................... E04D 1/22 52/545
3,973,887 A * 8/1976 Breckenfelder .......... E04D 1/28 425/130
4,258,948 A 3/1981 Hoffmann
4,349,220 A 9/1982 Carroll et al.
4,499,702 A 2/1985 Turner
4,636,577 A 1/1987 Peterpaul
4,848,057 A * 7/1989 MacDonald .............. E04D 1/28 52/518
5,167,579 A 12/1992 Rotter
5,305,569 A * 4/1994 Malmquist ................ E04D 1/26 52/309.8
5,437,735 A 8/1995 Younan et al.
5,590,495 A 1/1997 Bressler et al.
5,642,596 A 7/1997 Waddington
6,008,450 A 12/1999 Ohtsuka et al.
6,033,270 A 3/2000 Stuart
6,046,399 A 4/2000 Kapner
6,201,180 B1 3/2001 Meyer et al.
6,220,329 B1 4/2001 King et al.
6,308,482 B1 10/2001 Strait
6,319,456 B1 * 11/2001 Gilbert .................... B29C 53/34 264/296
6,320,114 B1 11/2001 Kuechler
6,320,115 B1 11/2001 Kataoka et al.
6,336,304 B1 1/2002 Mimura et al.
6,338,230 B1 * 1/2002 Davey ................... E04D 1/2918 52/518
6,341,454 B1 1/2002 Koleoglou
6,407,329 B1 6/2002 Iino et al.
6,576,830 B2 6/2003 Nagao et al.
6,928,781 B2 8/2005 Desbois et al.
6,972,367 B2 12/2005 Federspiel et al.
7,138,578 B2 11/2006 Komamine
7,155,870 B2 1/2007 Almy
7,178,295 B2 2/2007 Dinwoodie
7,487,771 B1 2/2009 Eiffert et al.
7,587,864 B2 9/2009 McCaskill et al.
7,678,990 B2 3/2010 McCaskill et al.
7,678,991 B2 3/2010 McCaskill et al.
7,726,086 B2 * 6/2010 Kalkanoglu ........ B29C 44/1271 52/309.8
7,748,191 B2 7/2010 Podirsky
7,819,114 B2 10/2010 Augenbraun et al.
7,824,191 B1 11/2010 Podirsky
7,832,176 B2 11/2010 McCaskill et al.
8,118,109 B1 2/2012 Hacker
8,168,880 B2 5/2012 Jacobs et al.
8,173,889 B2 5/2012 Kalkanoglu et al.
8,210,570 B1 7/2012 Railkar et al.
8,276,329 B2 10/2012 Lenox
8,312,693 B2 11/2012 Cappelli
8,319,093 B2 11/2012 Kalkanoglu et al.
8,333,040 B2 12/2012 Shiao et al.
8,371,076 B2 2/2013 Jones et al.
8,375,653 B2 2/2013 Shiao et al.
8,404,967 B2 3/2013 Kalkanoglu et al.
8,410,349 B2 4/2013 Kalkanoglu et al.
8,418,415 B2 4/2013 Shiao et al.
8,438,796 B2 5/2013 Shiao et al.
8,468,754 B2 6/2013 Railkar et al.
8,468,757 B2 6/2013 Krause et al.
8,505,249 B2 8/2013 Geary
8,512,866 B2 8/2013 Taylor
8,513,517 B2 8/2013 Kalkanoglu et al.
8,586,856 B2 11/2013 Kalkanoglu et al.
8,601,754 B2 12/2013 Jenkins et al.
8,629,578 B2 1/2014 Kurs et al.
8,646,228 B2 2/2014 Jenkins
8,656,657 B2 2/2014 Livsey et al.
8,671,630 B2 3/2014 Lena et al.
8,677,702 B2 3/2014 Jenkins
8,695,289 B2 4/2014 Koch et al.
8,713,858 B1 5/2014 Xie
8,713,860 B2 5/2014 Railkar et al.
8,733,038 B2 5/2014 Kalkanoglu et al.
8,776,455 B2 7/2014 Azoulay
8,789,321 B2 7/2014 Ishida
8,793,940 B2 8/2014 Kalkanoglu et al.
8,793,941 B2 8/2014 Bosler et al.
8,826,607 B2 9/2014 Shiao et al.
8,835,751 B2 9/2014 Kalkanoglu et al.
8,863,451 B2 10/2014 Jenkins et al.
8,898,963 B1 * 12/2014 Amatruda ............. E04D 1/2963 52/409
8,898,970 B2 12/2014 Jenkins et al.
8,898,987 B1 * 12/2014 Amatruda ................. E04D 1/28 52/557
8,925,262 B2 1/2015 Railkar et al.
8,925,272 B1 * 1/2015 Amatruda ............. E04D 1/2963 52/557
8,943,766 B2 2/2015 Gombarick et al.
8,946,544 B2 2/2015 Jabos et al.
8,950,128 B2 2/2015 Kalkanoglu et al.
8,959,848 B2 2/2015 Jenkins et al.
8,966,838 B2 3/2015 Jenkins
8,966,850 B2 3/2015 Jenkins et al.
8,994,224 B2 3/2015 Mehta et al.
9,032,672 B2 5/2015 Livsey et al.
9,153,950 B2 10/2015 Yamanaka et al.
9,166,087 B2 10/2015 Chihlas et al.
9,169,646 B2 10/2015 Rodrigues et al.
9,170,034 B2 10/2015 Bosler et al.
9,178,465 B2 11/2015 Shiao et al.
9,202,955 B2 12/2015 Livsey et al.
9,212,832 B2 12/2015 Jenkins
9,217,584 B2 12/2015 Kalkanoglu et al.
9,270,221 B2 2/2016 Zhao
9,273,885 B2 3/2016 Rordigues et al.
9,276,141 B2 3/2016 Kalkanoglu et al.
9,331,224 B2 5/2016 Koch et al.
9,356,174 B2 5/2016 Duarte et al.
9,359,014 B1 6/2016 Yang et al.
9,412,890 B1 8/2016 Meyers
9,528,270 B2 12/2016 Jenkins et al.
9,605,432 B1 3/2017 Robbins
9,711,672 B2 7/2017 Wang
9,755,573 B2 9/2017 Livsey et al.
9,786,802 B2 10/2017 Shiao et al.
9,831,818 B2 11/2017 West
9,912,284 B2 3/2018 Svec
9,923,515 B2 3/2018 Rodrigues et al.
9,938,729 B2 4/2018 Coon
9,966,898 B1 * 5/2018 Flanigan ................... E04D 1/12
9,991,412 B2 6/2018 Gonzalez et al.
9,998,067 B2 6/2018 Kalkanoglu et al.
10,027,273 B2 7/2018 West et al.
10,115,850 B2 10/2018 Rodrigues et al.
10,128,660 B1 11/2018 Apte et al.
10,156,075 B1 12/2018 McDonough
10,187,005 B2 1/2019 Rodrigues et al.
10,256,765 B2 4/2019 Rodrigues et al.
10,284,136 B1 5/2019 Mayfield et al.
10,454,408 B2 10/2019 Livsey et al.
10,530,292 B1 1/2020 Cropper et al.
10,560,048 B2 2/2020 Fisher et al.
10,563,406 B2 2/2020 Kalkanoglu et al.
D879,031 S 3/2020 Lance et al.
10,579,028 B1 3/2020 Jacob
10,784,813 B2 9/2020 Kalkanoglu et al.
D904,289 S 12/2020 Lance et al.
11,012,026 B2 5/2021 Kalkanoglu et al.
11,177,639 B1 11/2021 Nguyen et al.
11,217,715 B2 1/2022 Sharenko et al.
11,251,744 B1 2/2022 Bunea et al.
11,258,399 B2 2/2022 Kalkanoglu et al.
11,283,394 B2 3/2022 Perkins et al.

(56) References Cited

U.S. PATENT DOCUMENTS 11,309,828 B2 4/2022 Sirski et al.
11,394,344 B2 7/2022 Perkins et al.
11,424,379 B2 8/2022 Sharenko et al.
11,431,280 B2 8/2022 Liu et al.
11,431,281 B2 8/2022 Perkins et al.
11,444,569 B2 9/2022 Clemente et al.
11,454,027 B2 9/2022 Kuiper et al.
11,459,757 B2 10/2022 Nguyen et al.
11,486,144 B2 11/2022 Bunea et al.
11,489,482 B2 11/2022 Peterson et al.
11,496,088 B2 11/2022 Sirski et al.
11,508,861 B1 11/2022 Perkins et al.
11,512,480 B1 11/2022 Achor et al.
11,527,665 B2 12/2022 Boitnott
11,545,927 B2 1/2023 Abra et al.
11,545,928 B2 1/2023 Perkins et al.
11,658,470 B2 5/2023 Nguyen et al.
11,661,745 B2 5/2023 Bunea et al.
11,689,149 B2 6/2023 Clemente et al.
11,702,840 B2* 7/2023 Haynes .................... E04D 1/26 52/478
11,705,531 B2 7/2023 Sharenko et al.
11,728,759 B2 8/2023 Nguyen et al.
11,732,490 B2 8/2023 Achor et al.
11,811,361 B1 11/2023 Farhangi et al.
11,824,486 B2 11/2023 Nguyen et al.
11,824,487 B2 11/2023 Nguyen et al.
11,843,067 B2 12/2023 Nguyen et al.
2002/0053360 A1 5/2002 Kinoshita et al.
2002/0129849 A1 9/2002 Heckeroth
2003/0101662 A1 6/2003 Ullman
2003/0132265 A1 7/2003 Villela et al.
2003/0217768 A1 11/2003 Guha
2003/0230040 A1* 12/2003 Shirota .................... E04D 5/10 52/302.1
2004/0000334 A1 1/2004 Ressler
2004/0182032 A1* 9/2004 Koschitzky .......... E04D 1/2963 52/518
2005/0030187 A1 2/2005 Peress et al.
2005/0115603 A1 6/2005 Yoshida et al.
2005/0144870 A1 7/2005 Dinwoodie
2005/0178428 A1 8/2005 Laaly et al.
2005/0193673 A1 9/2005 Rodrigues et al.
2006/0042683 A1 3/2006 Gangemi
2006/0046084 A1 3/2006 Yang et al.
2007/0074757 A1 4/2007 Mellott et al.
2007/0181174 A1 8/2007 Ressler
2007/0193618 A1 8/2007 Bressler et al.
2007/0249194 A1 10/2007 Liao
2007/0295385 A1 12/2007 Sheats et al.
2008/0006323 A1 1/2008 Kalkanoglu et al.
2008/0035140 A1 2/2008 Placer et al.
2008/0315061 A1 2/2008 Placer et al.
2008/0078440 A1 4/2008 Lim et al.
2008/0185748 A1 8/2008 Kalkanoglu
2008/0271774 A1 11/2008 Kalkanoglu et al.
2008/0302030 A1 12/2008 Stancel et al.
2009/0000222 A1 1/2009 Kalkanoglu et al.
2009/0014057 A1 1/2009 Croft et al.
2009/0014058 A1 1/2009 Croft et al.
2009/0019795 A1 1/2009 Szacsvay et al.
2009/0044850 A1 2/2009 Kimberley
2009/0114261 A1 5/2009 Stancel et al.
2009/0133340 A1 5/2009 Shiao et al.
2009/0159118 A1 6/2009 Kalkanoglu et al.
2009/0178350 A1 7/2009 Kalkanoglu et al.
2009/0229652 A1 9/2009 Mapel et al.
2009/0275247 A1 11/2009 Richter et al.
2010/0019580 A1 1/2010 Croft et al.
2010/0095618 A1 4/2010 Edison et al.
2010/0101634 A1 4/2010 Frank et al.
2010/0116325 A1 5/2010 Nikoonahad
2010/0131108 A1 5/2010 Meyer
2010/0139184 A1 6/2010 Williams et al.
2010/0146878 A1 6/2010 Koch et al.
2010/0159221 A1 6/2010 Kourtakis et al.
2010/0170169 A1 7/2010 Railkar et al.
2010/0186798 A1 7/2010 Tormen et al.
2010/0242381 A1 9/2010 Jenkins
2010/0313499 A1 12/2010 Gangemi
2010/0325976 A1 12/2010 DeGenfelder et al.
2010/0326488 A1 12/2010 Aue et al.
2010/0326501 A1 12/2010 Zhao et al.
2011/0030761 A1 2/2011 Kalkanoglu et al.
2011/0036386 A1 2/2011 Browder
2011/0036389 A1 2/2011 Hardikar et al.
2011/0048507 A1 3/2011 Livsey et al.
2011/0058337 A1 3/2011 Han et al.
2011/0061326 A1 3/2011 Jenkins
2011/0100436 A1 5/2011 Cleereman et al.
2011/0104488 A1 5/2011 Muessig et al.
2011/0132427 A1 6/2011 Kalkanoglu et al.
2011/0168238 A1 7/2011 Metin et al.
2011/0239555 A1 10/2011 Cook et al.
2011/0302859 A1 12/2011 Crasnianski
2011/0314753 A1 12/2011 Farmer et al.
2012/0034799 A1 2/2012 Hunt
2012/0060434 A1 3/2012 Jacobs
2012/0060902 A1 3/2012 Drake
2012/0085392 A1 4/2012 Albert et al.
2012/0137600 A1 6/2012 Jenkins
2012/0176077 A1 7/2012 Oh et al.
2012/0212065 A1 8/2012 Cheng et al.
2012/0233940 A1 9/2012 Perkins et al.
2012/0240490 A1 9/2012 Gangemi
2012/0260977 A1 10/2012 Stancel
2012/0266942 A1 10/2012 Komatsu et al.
2012/0279150 A1 11/2012 Pislkak et al.
2012/0282437 A1 11/2012 Clark et al.
2012/0291848 A1 11/2012 Sherman et al.
2012/0310821 A1* 12/2012 Abramowitz ......... G09F 27/007 136/251
2013/0008499 A1 1/2013 Verger et al.
2013/0014455 A1 1/2013 Grieco
2013/0118558 A1 5/2013 Sherman
2013/0193769 A1 8/2013 Mehta et al.
2013/0247988 A1 9/2013 Reese et al.
2013/0284267 A1 10/2013 Plug et al.
2013/0306137 A1 11/2013 Ko
2014/0090697 A1 4/2014 Rodrigues et al.
2014/0150843 A1 6/2014 Pearce et al.
2014/0173997 A1 6/2014 Jenkins
2014/0179220 A1 6/2014 Railkar et al.
2014/0182222 A1 7/2014 Kalkanoglu et al.
2014/0208675 A1 7/2014 Beerer et al.
2014/0254776 A1 9/2014 O'Connor et al.
2014/0266289 A1 9/2014 Della Sera et al.
2014/0311556 A1 10/2014 Feng et al.
2014/0352760 A1 12/2014 Haynes et al.
2014/0366464 A1 12/2014 Rodrigues et al.
2015/0089895 A1 4/2015 Leitch
2015/0162459 A1 6/2015 Lu et al.
2015/0340516 A1 11/2015 Kim et al.
2015/0349173 A1 12/2015 Morad et al.
2016/0105144 A1 4/2016 Haynes et al.
2016/0142008 A1 5/2016 Lopez et al.
2016/0254776 A1 9/2016 Rodrigues et al.
2016/0276508 A1 9/2016 Huang et al.
2016/0359451 A1 12/2016 Mao et al.
2017/0159292 A1 6/2017 Chihlas et al.
2017/0179319 A1 6/2017 Yamashita et al.
2017/0179726 A1 6/2017 Garrity et al.
2017/0237390 A1 8/2017 Hudson et al.
2017/0331415 A1 11/2017 Koppi et al.
2018/0094438 A1 4/2018 Wu et al.
2018/0097472 A1 4/2018 Anderson et al.
2018/0115275 A1 4/2018 Flanigan et al.
2018/0254738 A1 9/2018 Yang et al.
2018/0294765 A1 10/2018 Friedrich et al.
2018/0351502 A1 12/2018 Almy et al.
2018/0367089 A1 12/2018 Stutterheim et al.
2019/0030867 A1 1/2019 Sun et al.
2019/0081436 A1 3/2019 Onodi et al.
2019/0097069 A1* 3/2019 Kim ....................... H02S 20/26

(56) References Cited

U.S. PATENT DOCUMENTS

| | | | | |
|---|---|---|---|---|
| 2019/0123679 | A1 | 4/2019 | Rodrigues et al. | |
| 2019/0253022 | A1 | 8/2019 | Hardar et al. | |
| 2019/0305717 | A1 | 10/2019 | Allen et al. | |
| 2019/0393836 | A1 * | 12/2019 | Ackermann | H02S 99/00 |
| 2020/0109320 | A1 | 4/2020 | Jiang | |
| 2020/0144958 | A1 | 5/2020 | Rodrigues et al. | |
| 2020/0220819 | A1 | 7/2020 | Vu et al. | |
| 2020/0224419 | A1 | 7/2020 | Boss et al. | |
| 2020/0343397 | A1 | 10/2020 | Hem-Jensen | |
| 2021/0083619 | A1 | 3/2021 | Hegedus | |
| 2021/0115223 | A1 | 4/2021 | Bonekamp et al. | |
| 2021/0159353 | A1 | 5/2021 | Li et al. | |
| 2021/0301536 | A1 | 9/2021 | Baggs et al. | |
| 2021/0343886 | A1 | 11/2021 | Sharenko et al. | |
| 2022/0149213 | A1 | 5/2022 | Mensink et al. | |

FOREIGN PATENT DOCUMENTS

| | | | | |
|---|---|---|---|---|
| CN | 202797032 | U | 3/2013 | |
| CN | 217150978 | U | 8/2022 | |
| DE | 1958248 | A1 | 11/1971 | |
| EP | 1039361 | A1 | 9/2000 | |
| EP | 1837162 | A1 | 9/2007 | |
| EP | 1774372 | A1 | 7/2011 | |
| EP | 2446481 | A2 | 5/2012 | |
| EP | 2784241 | A1 | 10/2014 | |
| EP | 3772175 | A1 | 2/2021 | |
| JP | 10046767 | A | 2/1998 | |
| JP | 2001098703 | A * | 4/2001 | F24S 20/69 |
| JP | 2002-106151 | A | 4/2002 | |
| JP | 2017-027735 | A | 2/2017 | |
| JP | 2018053707 | A | 4/2018 | |
| KR | 20090084060 | A | 8/2009 | |
| KR | 20100132595 | A * | 12/2010 | |
| KR | 10-1348283 | B1 | 1/2014 | |
| KR | 10-2019-0000367 | A | 1/2019 | |
| KR | 10-2253483 | B1 | 5/2021 | |
| NL | 2026856 | B1 | 6/2022 | |
| WO | 2010/151777 | A2 | 12/2010 | |
| WO | 2011/049944 | A1 | 4/2011 | |
| WO | 2015/133632 | A1 | 9/2015 | |
| WO | 2018/000589 | A1 | 1/2018 | |
| WO | 2019/201416 | A1 | 10/2019 | |
| WO | 2020-159358 | A1 | 8/2020 | |
| WO | 2021-168126 | A1 | 8/2021 | |
| WO | 2021-247098 | A1 | 12/2021 | |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

ROOFING SHINGLE AND METHOD OF MANUFACTURING SAME

CROSS-REFERENCE TO RELATED APPLICATION

This application is a Section 111(a) application relating to and claiming the benefit of commonly-owned, co-pending U.S. Provisional Patent Application Ser. No. 63/313,024, filed Feb. 23, 2022, entitled "ROOFING SHINGLE AND METHOD OF MANUFACTURING SAME," the contents of each of which are incorporated herein by reference in its entirety.

FIELD OF THE INVENTION

The present invention relates to roofing shingles and methods of manufacturing same.

BACKGROUND OF THE INVENTION

Photovoltaic systems having solar shingles are commonly installed on roofing of structures.

SUMMARY OF THE INVENTION

In some embodiments, a system includes a plurality of roofing shingles installed on a roof deck, each of the roofing shingles includes a core layer having a first end and a second end opposite the first end, and a cap layer overlaying the core layer, wherein the cap layer includes a first end and a second end opposite the first end of the cap layer, wherein the second end of the cap layer is offset from the second end of the core layer, wherein the first end of the cap layer is offset from the first end of the core layer, wherein the cap layer includes a first surface and a pattern on the first surface, a side lap extending from the second end of the cap layer to the second end of the core layer, an extended portion at the first end of the cap layer, wherein the extended portion of a first one of the roofing shingles overlays the side lap of a second one of the roofing shingles; and a plurality of photovoltaic modules, each of the plurality of photovoltaic modules include at least one solar cell.

In some embodiments, the second end of the cap layer is offset from the second end of the core layer by 1 inch to 10 inches. In some embodiments, each of the core layer and the cap layer is composed of a polymeric material. In some embodiments, the polymeric material is thermoplastic polyolefin (TPO). In some embodiments, the cap layer is welded to the core layer. In some embodiments, the cap layer is adhered to the core layer by an adhesive. In some embodiments, the pattern includes a plurality of indentations. In some embodiments, the pattern includes a depiction of a plurality of solar cells.

In some embodiments, a roofing shingle includes a core layer having a first end and a second end opposite the first end; a cap layer overlaying the core layer; wherein the cap layer includes a first end and a second end opposite the first end of the cap layer, wherein the second end of the cap layer is offset from the second end of the core layer, wherein the first end of the cap layer is offset from the first end of the core layer, wherein the cap layer includes a first surface and a pattern on the first surface, a side lap extending from the second end of the cap layer to the second end of the core layer; and an extended portion at the first end of the cap layer, wherein the extended portion of the roofing shingle is configured to overlay a side lap of another one of the roofing shingles, and wherein the roofing shingle is configured to be installed on a roof deck.

In some embodiments, the second end of the cap layer is offset from the second end of the core layer by 1 inch to 10 inches. In some embodiments, each of the core layer and the cap layer is composed of a polymeric material. In some embodiments, the polymeric material is thermoplastic polyolefin (TPO). In some embodiments, the cap layer is welded to the core layer. In some embodiments, the cap layer is adhered to the core layer by an adhesive. In some embodiments, the pattern includes a plurality of indentations. In some embodiments, the pattern includes a depiction of a plurality of solar cells.

In some embodiments, a method includes the steps of obtaining a plurality of roofing shingles, each of the roofing shingles includes a core layer having a first end and a second end opposite the first end, a cap layer overlaying the core layer, wherein the cap layer includes a first end and a second end opposite the first end of the cap layer, wherein the second end of the cap layer is offset from the second end of the core layer, wherein the first end of the cap layer is offset from the first end of the core layer, wherein the cap layer includes a first surface and a pattern on the first surface, a side lap extending from the second end of the cap layer to the second end of the core layer, and an extended portion at the first end of the cap layer; obtaining a plurality of photovoltaic modules, each of the plurality of photovoltaic modules includes at least one solar cell, installing the plurality of photovoltaic modules on a roof deck; installing the plurality of roofing modules on the roof deck proximate to the plurality of photovoltaic modules, and wherein the extended portion of a first roofing shingle of the plurality of roofing shingles overlays the side lap of a second roofing shingle of the plurality of roofing shingles.

In some embodiments, a method includes the steps of obtaining a core layer of a first material, wherein the core layer includes a first end and a second end opposite the first end; obtaining a cap layer of a second material, wherein the cap layer includes a first end and a second end opposite the first end of the cap layer; positioning the second end of the cap layer offset from the second end of the core layer and positioning the first end of the cap layer offset from the first end of the core layer; overlaying the cap layer over the core layer; and attaching the cap layer to the core layer to form at least one roofing shingle, wherein the at least one roofing shingle includes a side lap extending from the second end of the cap layer to the second end of the core layer, and wherein the at least one roofing shingle includes an extended portion at the first end of the cap layer, wherein the extended portion of a first roofing shingle of the at least one roofing shingle is configured to overlay the side lap of a second roofing shingle of the at least one roofing shingle. In some embodiments, the method further includes the step of creating a pattern on a surface of the cap layer. In some embodiments, the overlaying step includes rolling the core layer by a first infeed roller and rolling the cap layer by a second infeed roller, wherein the first infeed roller is offset from the second infeed roller.

DETAILED DESCRIPTION

Figure 1:
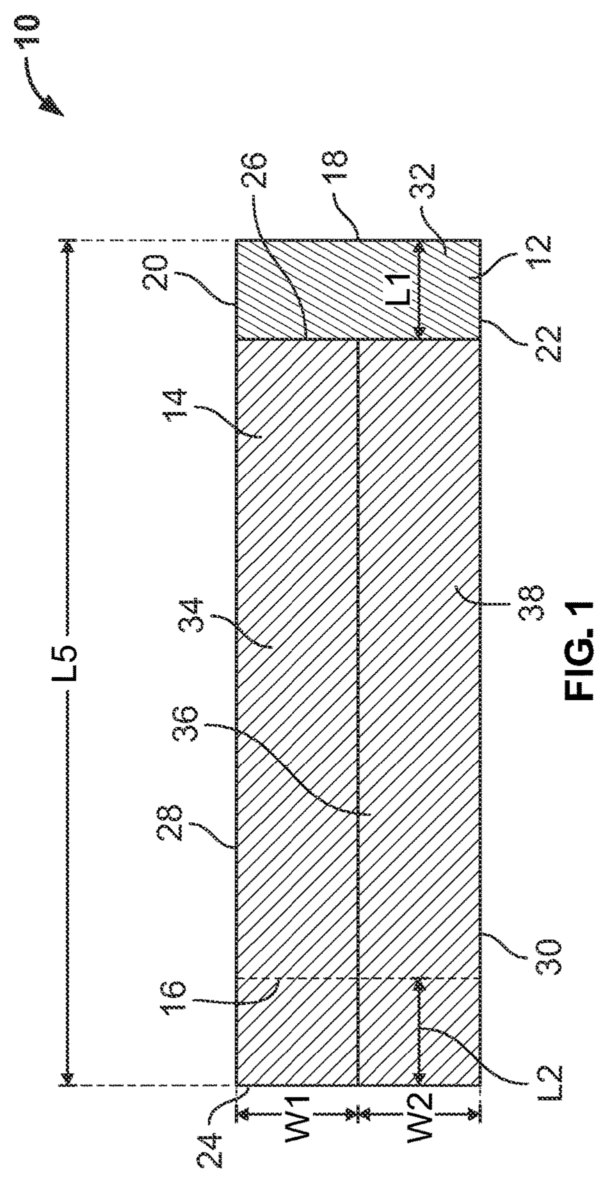
FIG. 1 is a top plan view of some embodiments of a roofing shingle.
Figure 2:
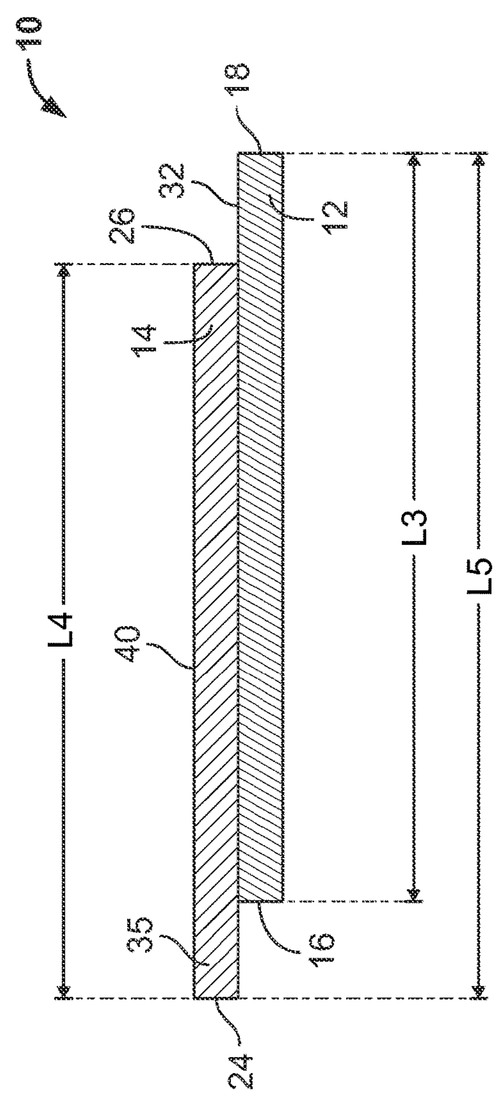
FIG. 2 is a side elevational view of some embodiments the roofing shingle shown in FIG. 1.

Referring to FIGS. 1 and 2, in some embodiments, a roofing shingle 10 includes a core layer 12 and a cap layer 14. In some embodiments, the cap layer 14 overlays the core layer 12. In some embodiments, the core layer 12 includes a first end 16, a second end 18 opposite the first end 16, a first edge 20 extending from the first end 16 to the second end 18, and a second edge 22 opposite the first edge 20 and extending from the first end 16 to the second end 18. In some embodiments, the cap layer 14 includes a first end 24, a second end 26 opposite the first end 24, a first edge 28 extending from the first end 24 to the second end 26, and a second edge 30 opposite the first edge 28 and extending from the first end 24 to the second end 26. In some embodiments, the second end 18 of the core layer 12 is offset from the second end 26 of the cap layer 14. In some embodiments, the second end 18 of the core layer 12 is offset from the second end 26 of the cap layer 14 by a length L1.

In some embodiments, the length L1 is 1 inch to 10 inches. In some embodiments, the length L1 is 1 inch to 9 inches. In some embodiments, the length L1 is 1 inch to 8 inches. In some embodiments, the length L1 is 1 inch to 7 inches. In some embodiments, the length L1 is 1 inch to 6 inches. In some embodiments, the length L1 is 1 inch to 5 inches. In some embodiments, the length L1 is 1 inch to 4 inches. In some embodiments, the length L1 is 1 inch to 3 inches. In some embodiments, the length L1 is 1 inch to 2 inches. In some embodiments, the length L1 is 2 inches to 10 inches. In some embodiments, the length L1 is 2 inches to 9 inches. In some embodiments, the length L1 is 2 inches to 8 inches. In some embodiments, the length L1 is 2 inches to 7 inches. In some embodiments, the length L1 is 2 inches to 6 inches. In some embodiments, the length L1 is 2 inches to 5 inches. In some embodiments, the length L1 is 2 inches to 4 inches. In some embodiments, the length L1 is 2 inches to 3 inches. In some embodiments, the length L1 is 3 inches to 10 inches. In some embodiments, the length L1 is 3 inches to 9 inches. In some embodiments, the length L1 is 3 inches to 8 inches. In some embodiments, the length L1 is 3 inches to 7 inches. In some embodiments, the length L1 is 3 inches to 6 inches. In some embodiments, the length L1 is 3 inches to 5 inches. In some embodiments, the length L1 is 3 inches to 4 inches. In some embodiments, the length L1 is 4 inches to 10 inches. In some embodiments, the length L1 is 4 inches to 9 inches. In some embodiments, the length L1 is 4 inches to 8 inches. In some embodiments, the length L1 is 4 inches to 7 inches. In some embodiments, the length L1 is 4 inches to 6 inches. In some embodiments, the length L1 is 4 inches to 5 inches.

In some embodiments, the length L1 is 5 inches to 10 inches. In some embodiments, the length L1 is 5 inches to 9 inches. In some embodiments, the length L1 is 5 inches to 8 inches. In some embodiments, the length L1 is 5 inches to 7 inches. In some embodiments, the length L1 is 5 inches to 6 inches. In some embodiments, the length L1 is 6 inches to 10 inches. In some embodiments, the length L1 is 6 inches to 9 inches. In some embodiments, the length L1 is 6 inches to 8 inches. In some embodiments, the length L1 is 6 inches to 7 inches. In some embodiments, the length L1 is 7 inches to 10 inches. In some embodiments, the length L1 is 7 inches to 9 inches. In some embodiments, the length L1 is 7 inches to 8 inches. In some embodiments, the length L1 is 8 inches to 10 inches. In some embodiments, the length L1 is 8 inches to 9 inches. In some embodiments, the length L1 is 9 inches to 10 inches.

In some embodiments, the length L1 is 1 inch. In some embodiments, the length L1 is 2 inches. In some embodiments, the length L1 is 3 inches. In some embodiments, the length L1 is 4 inches. In some embodiments, the length L1 is 5 inches. In some embodiments, the length L1 is 6 inches. In some embodiments, the length L1 is 7 inches. In some embodiments, the length L1 is 8 inches. In some embodiments, the length L1 is 9 inches. In some embodiments, the length L1 is 10 inches.

In some embodiments, the offset of the core layer 12 from the cap layer 14 forms a side lap 32. In some embodiments, the first end 16 of the core layer 12 is offset from the first end 24 of the cap layer 14. In some embodiments, the first end 16 of the core layer 12 is offset from the first end 24 of the cap layer 14 by a length L2.

In some embodiments, the length L2 is 1 inch to 10 inches. In some embodiments, the length L2 is 1 inch to 9 inches. In some embodiments, the length L2 is 1 inch to 8 inches. In some embodiments, the length L2 is 1 inch to 7 inches. In some embodiments, the length L2 is 1 inch to 6 inches. In some embodiments, the length L2 is 1 inch to 5 inches. In some embodiments, the length L2 is 1 inch to 4 inches. In some embodiments, the length L2 is 1 inch to 3 inches. In some embodiments, the length L2 is 1 inch to 2 inches. In some embodiments, the length L2 is 2 inches to 10 inches. In some embodiments, the length L2 is 2 inches to 9 inches. In some embodiments, the length L2 is 2 inches to 8 inches. In some embodiments, the length L2 is 2 inches to 7 inches. In some embodiments, the length L2 is 2 inches to 6 inches. In some embodiments, the length L2 is 2 inches to 5 inches. In some embodiments, the length L2 is 2 inches to 4 inches. In some embodiments, the length L2 is 2 inches to 3 inches. In some embodiments, the length L2 is 3 inches to 10 inches. In some embodiments, the length L2 is 3 inches to 9 inches. In some embodiments, the length L2 is 3 inches to 8 inches. In some embodiments, the length L2 is 3 inches to 7 inches. In some embodiments, the length L2 is 3 inches to 6 inches. In some embodiments, the length L2 is 3 inches to 5 inches. In some embodiments, the length L2 is 3 inches to 4 inches. In some embodiments, the length L2 is 4 inches to 10 inches. In some embodiments, the length L2 is 4 inches to 9 inches. In some embodiments, the length L2 is 4 inches to 8 inches. In some embodiments, the length L2 is 4 inches to 7 inches. In some embodiments, the length L2 is 4 inches to 6 inches. In some embodiments, the length L2 is 4 inches to 5 inches.

In some embodiments, the length L2 is 5 inches to 10 inches. In some embodiments, the length L2 is 5 inches to 9 inches. In some embodiments, the length L2 is 5 inches to 8 inches. In some embodiments, the length L2 is 5 inches to 7 inches. In some embodiments, the length L2 is 5 inches to 6 inches. In some embodiments, the length L2 is 6 inches to 10 inches. In some embodiments, the length L2 is 6 inches to 9 inches. In some embodiments, the length L2 is 6 inches to 8 inches. In some embodiments, the length L2 is 6 inches to 7 inches. In some embodiments, the length L2 is 7 inches to 10 inches. In some embodiments, the length L2 is 7 inches to 9 inches. In some embodiments, the length L2 is 7 inches to 8 inches. In some embodiments, the length L2 is 8 inches to 10 inches. In some embodiments, the length L2 is 8 inches to 9 inches. In some embodiments, the length L2 is 9 inches to 10 inches.

In some embodiments, the length L2 is 1 inch. In some embodiments, the length L2 is 2 inches. In some embodiments, the length L2 is 3 inches. In some embodiments, the length L2 is 4 inches. In some embodiments, the length L2 is 5 inches. In some embodiments, the length L2 is 6 inches. In some embodiments, the length L2 is 7 inches. In some embodiments, the length L2 is 8 inches. In some embodiments, the length L2 is 9 inches. In some embodiments, the length L2 is 10 inches.

In some embodiments, the length L1 is equal to the length L2. In some embodiments, the length L1 is different from the length L2. In some embodiments, the offset of the core layer 12 from the cap layer 14 forms an extended portion 35.

In some embodiments, the core layer 12 has a length L3. In some embodiments, the length L3 is 30 inches to 60 inches. In some embodiments, the length L3 is 30 inches to 50 inches. In some embodiments, the length L3 is 30 inches to 40 inches. In some embodiments, the length L3 is 40 inches to 60 inches. In some embodiments, the length L3 is 40 inches to 50 inches. In some embodiments, the length L3 is 50 inches to 60 inches. In some embodiments, the length L3 is 30 inches. In some embodiments, the length L3 is 40 inches. In some embodiments, the length L3 is 50 inches. In some embodiments, the length L3 is 60 inches.

In some embodiments, the cap layer 14 has a length L4. In some embodiments, the length L4 is 30 inches to 60 inches. In some embodiments, the length L4 is 30 inches to 50 inches. In some embodiments, the length L4 is 30 inches to 40 inches. In some embodiments, the length L4 is 40 inches to 60 inches. In some embodiments, the length L4 is 40 inches to 50 inches. In some embodiments, the length L4 is 50 inches to 60 inches. In some embodiments, the length L4 is 30 inches. In some embodiments, the length L4 is 40 inches. In some embodiments, the length L4 is 50 inches. In some embodiments, the length L4 is 60 inches. In some embodiments, the roofing shingle 10 has a total length L5. In some embodiments, the length L5 is 32 inches to 66 inches.

In some embodiments, the roofing shingle 10 includes a head lap portion 34 extending from the first end 24 to the second end 26 of the cap layer 14, and from the first edge 28 to a location 36 between the first edge 28 to second edge 30 of the cap layer 14. In some embodiments, the roofing shingle 10 includes a reveal portion 38 extending from the first end 24 to the second end 26 of the cap layer 14, and from the second edge 30 to the location 36.

In some embodiments, the head lap portion 34 has a width W1. In some embodiments, the width W1 is 1 inch to 16 inches. In some embodiments, the width W1 is 1 inch to 15 inches. In some embodiments, the width W1 is 1 inch to 10 inches. In some embodiments, the width W1 is 1 inch to 5 inches. In some embodiments, the width W1 is 5 inches to 16 inches. In some embodiments, the width W1 is 5 inches to 15 inches. In some embodiments, the width W1 is 5 inches to 10 inches. In some embodiments, the width W1 is 10 inches to 16 inches. In some embodiments, the width W1 is 10 inches to 15 inches. In some embodiments, the width W1 is 15 inches to 16 inches. In some embodiments, the width W1 is 1 inch. In some embodiments, the width W1 is 5 inches. In some embodiments, the width W1 is 10 inches. In some embodiments, the width W1 is 15 inches. In some embodiments, the width W1 is 16 inches.

In some embodiments, the reveal portion 38 has a width W2. In some embodiments, the width W2 is 5 inches to 12 inches. In some embodiments, the width W2 is 5 inches to 10 inches. In some embodiments, the width W2 is 10 inches to 12 inches. In some embodiments, the width W2 is 5 inches. In some embodiments, the width W2 is 10 inches. In some embodiments, the width W2 is 12 inches.

In some embodiments, the core layer 12 is composed of a polymeric material. In some embodiments, the core layer 12 is composed of a thermoplastic polymer. In some embodiments, the core layer 12 is composed of polyethylene terephthalate ("PET"). In another embodiment, the core layer 12 is composed of ethylene tetrafluoroethylene ("ETFE"). In some embodiments, the core layer 12 is composed of an acrylic such as polymethyl methacrylate ("PMMA"). In some embodiments, the core layer 12 is composed of thermoplastic polyolefin (TPO). In some embodiments, the core layer 12 is composed of a single ply TPO roofing membrane. In other embodiments, non-limiting examples of TPO membranes are disclosed in U.S. Pat. No. 9,359,014 to Yang et al., which is incorporated by reference herein in its entirety. In another embodiment, the core layer 12 includes polyvinyl chloride. In some embodiments, the core layer 12 is composed of ethylene propylene diene monomer (EPDM) rubber. In some embodiments, the core layer 12 is composed of a natural rubber. In some embodiments, the core layer 12 is composed of high density polyethylene (HDPE). In some embodiments, the core layer 12 is composed of polypropylene (PP). In some embodiments, the core layer 12 is composed of a polyolefin elastomer (POE). In some embodiments, the core layer 12 is composed of polyvinyl chloride (PVC). In some embodiments, the core layer 12 includes a flame retardant additive. In some embodiments, the flame retardant additive may be clays, nanoclays, silicas, carbon black, metal hydroxides such as aluminum hydroxide, metal foils, graphite, and combinations thereof.

In some embodiments, the core layer 12 includes a composite material. In some embodiments, the core layer 12 is composed of a composite material that incorporates fiberglass into a polymer matrix of a PP, asphalt or TPO. In some embodiments, the composite materials may have a solar reflectance that is at least 20% greater than conventional composite materials. In some embodiments, the composite materials may be used as a roof attachment and a water shedding layer. In some embodiments, the composite materials, when used as roofing materials for photovoltaic modules, may increase power for such photovoltaic modules by 1% to 2%. In some embodiments, the composite materials may have a relative temperature index (RTI) of greater than 90° C. In some embodiments, the composite material may be a black thermoplastic polyolefin membrane.

As used herein, the term "building material" may include, without limitation, at least one of a roofing material, a siding, a flooring, or any combination thereof. As used herein, the term "roofing material" may include any material of a roof and may include, for example and without limitation, at least one of shingles (e.g., such as photovoltaic modules), roofing membranes (e.g., such as waterproofing membranes), underlayments, tiles, any component thereof, or any combination thereof In some embodiments, the roofing material may comprise, consist of, or consist essentially of a component of a photovoltaic module. For example, in some embodiments, the roofing material may comprise, consist of, or consist essentially of a backsheet or a portion of a backsheet (e.g., a bottom flap, a head lap, etc.). Further examples of roofing materials include, without limitation, at least one of rolled roofing, flexible rolled roofing, or any combination thereof.

In some embodiments, the composite material is a roofing composite material. In some embodiments, the roofing composite material may comprise, consist of, or consist essentially of one or more layers. For example, in some embodiments, the roofing composite material may comprise, consist of, or consist essentially of at least one of a substrate, a cap, a core, or any combination thereof In some embodiments, the substrate may have a first surface and a second surface opposite the first surface. In some embodiments, the cap may be on the first surface of the substrate. In some embodiments, the cap may be in contact with the first surface of the substrate. In some embodiments, the core may be on the second surface of the substrate. In some embodiments, the core may be in contact with the second surface of the substrate. In some embodiments, one or more layers may be located between the cap and the substrate. In some embodiments, one or more layers may be located between the core and the substrate.

In some embodiments, the core layer 12 has a thickness of 0.1 mm to 5 mm. In some embodiments, the core layer 12 has a thickness of 0.1 mm to 4 mm. In some embodiments, the core layer 12 has a thickness of 0.1 mm to 3 mm. In some embodiments, the core layer 12 has a thickness of 0.1 mm to 2 mm. In some embodiments, the core layer 12 has a thickness of 0.1 mm to 1 mm. In some embodiments, the core layer 12 has a thickness of 1 mm to 5 mm. In some embodiments, the core layer 12 has a thickness of 1 mm to 4 mm. In some embodiments, the core layer 12 has a thickness of 1 mm to 3 mm. In some embodiments, the core layer 12 has a thickness of 1 mm to 2 mm. In some embodiments, the core layer 12 has a thickness of 2 mm to 5 mm. In some embodiments, the core layer 12 has a thickness of 2 mm to 4 mm. In some embodiments, the core layer 12 has a thickness of 2 mm to 3 mm. In some embodiments, the core layer 12 has a thickness of 3 mm to 5 mm. In some embodiments, the core layer 12 has a thickness of 3 mm to 4 mm. In some embodiments, the core layer 12 has a thickness of 4 mm to 5 mm. In some embodiments, the core layer 12 has a thickness of 0.1 mm. In some embodiments, the core layer 12 has a thickness of 1 mm. In some embodiments, the core layer 12 has a thickness of 2 mm. In some embodiments, the core layer 12 has a thickness of 3 mm. In some embodiments, the core layer 12 has a thickness of 4 mm. In some embodiments, the core layer 12 has a thickness of 5 mm.

In some embodiments, the cap layer 14 includes a polymeric material. In some embodiments, the cap layer 14 includes polyethylene terephthalate ("PET"). In another embodiment, the cap layer 14 includes ethylene tetrafluoroethylene ("ETFE"). In some embodiments, the cap layer 14 includes an acrylic such as polymethyl methacrylate ("PMMA"). In some embodiments, the cap layer 14 includes thermoplastic polyolefin (TPO). In some embodiments, the cap layer 14 includes a single ply TPO roofing membrane. In other embodiments, non-limiting examples of TPO membranes are disclosed in U.S. Pat. No. 9,359,014 to Yang et al., which is incorporated by reference herein in its entirety. In another embodiment, the cap layer 14 includes polyvinyl chloride. In some embodiments, the cap layer 14 includes ethylene propylene diene monomer (EPDM) rubber. In some embodiments, the cap layer 14 is composed of a natural rubber. In some embodiments, the cap layer 14 is composed of high density polyethylene (HDPE). In some embodiments, the cap layer 14 is composed of polypropylene (PP). In some embodiments, the cap layer 14 is composed of a polyolefin elastomer (POE). In some embodiments, the cap layer 14 is composed of polyvinyl chloride (PVC). In some embodiments, the cap layer 14 includes a flame retardant additive. In some embodiments, the flame retardant additive may be clays, nanoclays, silicas, carbon black, metal hydroxides such as aluminum hydroxide, metal foils, graphite, and combinations thereof. In some embodiments, the cap layer 14 includes a composite material. In some embodiments, the cap layer 14 is composed of a composite material that incorporates fiberglass into a polymer matrix of a PP, asphalt or TPO. In some embodiments, the cap layer 14 is composed of a composite material as described above with respect to the core layer 12.

In some embodiments, the core layer 12 includes magnesium oxide (MgO). In some embodiments, the core layer 12 includes 35% to 50% by weight of MgO. In some embodiments, the core layer 12 includes 35% to 45% by weight of MgO. In some embodiments, the core layer 12 includes 35% to 40% by weight of MgO. In some embodiments, the core layer 12 includes 40% to 50% by weight of MgO. In some embodiments, the core layer 12 includes 40% to 45% by weight of MgO. In some embodiments, the core layer 12 includes 45% to 50% by weight of MgO. In some embodiments, the core layer 12 includes 35% by weight of MgO. In some embodiments, the core layer 12 includes 40% by weight of MgO. In some embodiments, the core layer 12 includes 45% by weight of MgO. In some embodiments, the core layer 12 includes 50% by weight of MgO.

In some embodiments, the core layer 12 includes ketone ethylene ester (KEE). In some embodiments, the core layer 12 includes a PVC-KEE hybrid membrane. In some embodiments, the roofing shingle 10 is adapted to be a component of a photovoltaic system that includes a fire resistance that conforms to standards under UL 790/ASTM E 108 test standards. In some embodiments, the roofing shingle 10 includes a Class A rating when tested in accordance with UL 790/ASTM E 108.

In some embodiments, the core layer 12 and the cap layer 14 are welded to one another. In some embodiments, the core layer 12 and the cap layer 14 are ultrasonically welded to one another. In some embodiments, the core layer 12 and the cap layer 14 are heat welded to one another. In some embodiments, the core layer 12 and the cap layer 14 are thermally bonded to one another.

Figure 2A:
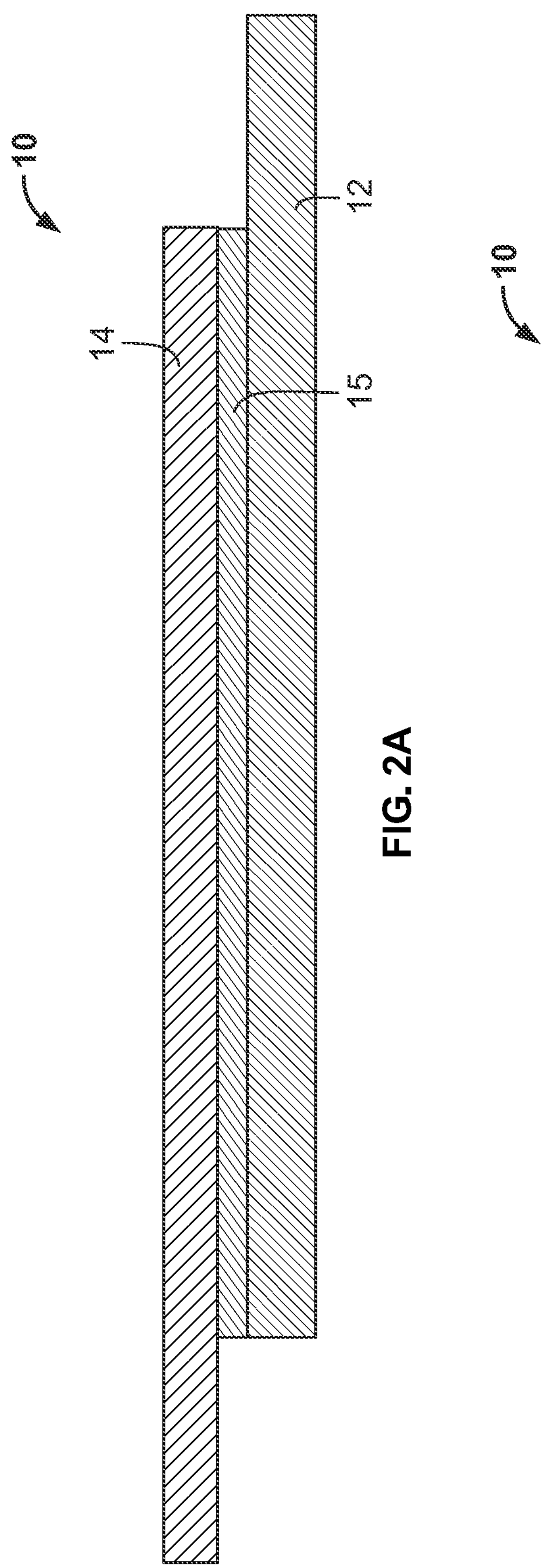
FIG. 2A is a side elevational view of some embodiments of a roofing shingle.

In some embodiments, the core layer 12 and the cap layer 14 are adhered to one another by an adhesive layer 15 (see FIG. 2A). In some embodiments, the adhesive layer 15 includes an adhesive. In some embodiments, the adhesive layer 15 may include butyl, polyvinyl butyrate, acrylic, silicone, or polycarbonate. In some embodiments, the first adhesive layer 15 may include pressure sensitive adhesives.

In some embodiments, the core layer 12 and the cap layer 14 are laminated. In some embodiments, the core layer 12 and the cap layer 14 are co-extruded. In some embodiments, the core layer 12 and the cap layer 14 are mechanically attached to one another. In some embodiments, the core layer 12 and the cap layer 14 are attached to one another by at least one fastener. In some embodiments, the core layer 12 and the cap layer 14 are attached to one another by a plurality of fasteners. In some embodiments, the core layer 12 and the cap layer 14 are attached to one another by deforming one of the core layer 12 and the cap layer 14 into the other one of the core layer 12 and the cap layer 14. In some embodiments, the core layer 12 and the cap layer 14 are attached to one another by deforming a portion of one of the core layer 12 and the cap layer 14 into the other one of the core layer 12 and the cap layer 14. In some embodiments, the core layer 12 and the cap layer 14 are attached to one another by forming at least one hole in one or both of the core layer 12 and the cap layer 14 and dispensing molten material into the at least one hole to connect the core layer 12 and the cap layer 14. In some embodiments, non-limiting examples of fasteners, fastening means and methods for fastening, connecting and attaching the core layer 12 to the cap layer 14 are disclosed in U.S. Pat. No. 7,833,371 to Binkley et al, U.S. Pat. No. 8,006,457 to Binkley et al, U.S. Pat. No. 8,127,514 to Binkley et al, and U.S. Pat. No. 8,316,608 to Binkley et al, each of which is incorporated by reference herein in its entirety.

In some embodiments, the cap layer 14 has a thickness of 0.1 mm to 5 mm. In some embodiments, the cap layer 14 has a thickness of 0.1 mm to 4 mm. In some embodiments, the cap layer 14 has a thickness of 0.1 mm to 3 mm. In some embodiments, the cap layer 14 has a thickness of 0.1 mm to 2 mm. In some embodiments, the cap layer 14 has a thickness of 0.1 mm to 1 mm. In some embodiments, the cap layer 14 has a thickness of 1 mm to 5 mm. In some embodiments, the cap layer 14 has a thickness of 1 mm to 4 mm. In some embodiments, the cap layer 14 has a thickness of 1 mm to 3 mm. In some embodiments, the cap layer 14 has a thickness of 1 mm to 2 mm. In some embodiments, the cap layer 14 has a thickness of 2 mm to 5 mm. In some embodiments, the cap layer 14 has a thickness of 2 mm to 4 mm. In some embodiments, the cap layer 14 has a thickness of 2 mm to 3 mm. In some embodiments, the cap layer 14 has a thickness of 3 mm to 5 mm. In some embodiments, the cap layer 14 has a thickness of 3 mm to 4 mm. In some embodiments, the cap layer 14 has a thickness of 4 mm to 5 mm. In some embodiments, the cap layer 14 has a thickness of 0.1 mm. In some embodiments, the cap layer 14 has a thickness of 1 mm. In some embodiments, the cap layer 14 has a thickness of 2 mm. In some embodiments, the cap layer 14 has a thickness of 3 mm. In some embodiments, the cap layer 14 has a thickness of 4 mm. In some embodiments, the cap layer 14 has a thickness of 5 mm.

In some embodiments, the roofing shingle 10 has a thickness of 0.2 mm to 10 mm. In some embodiments, the roofing shingle 10 has a thickness of 0.2 mm to 9 mm. In some embodiments, the roofing shingle 10 has a thickness of 0.2 mm to 8 mm. In some embodiments, the roofing shingle 10 has a thickness of 0.2 mm to 7 mm. In some embodiments, the roofing shingle 10 has a thickness of 0.2 mm to 6 mm. In some embodiments, the roofing shingle 10 has a thickness of 0.2 mm to 5 mm. In some embodiments, the roofing shingle 10 has a thickness of 0.2 mm to 4 mm. In some embodiments, the roofing shingle 10 has a thickness of 0.2 mm to 3 mm. In some embodiments, the roofing shingle 10 has a thickness of 0.2 mm to 2 mm. In some embodiments, the roofing shingle 10 has a thickness of 0.2 mm to 1 mm.

In some embodiments, the roofing shingle 10 has a thickness of 1 mm to 10 mm. In some embodiments, the roofing shingle 10 has a thickness of 1 mm to 9 mm. In some embodiments, the roofing shingle 10 has a thickness of 1 mm to 8 mm. In some embodiments, the roofing shingle 10 has a thickness of 1 mm to 7 mm. In some embodiments, the roofing shingle 10 has a thickness of 1 mm to 6 mm. In some embodiments, the roofing shingle 10 has a thickness of 1 mm to 5 mm. In some embodiments, the roofing shingle 10 has a thickness of 1 mm to 4 mm. In some embodiments, the roofing shingle 10 has a thickness of 1 mm to 3 mm. In some embodiments, the roofing shingle 10 has a thickness of 1 mm to 2 mm. In some embodiments, the roofing shingle 10 has a thickness of 2 mm to 10 mm. In some embodiments, the roofing shingle 10 has a thickness of 2 mm to 9 mm. In some embodiments, the roofing shingle 10 has a thickness of 2 mm to 8 mm. In some embodiments, the roofing shingle 10 has a thickness of 2 mm to 7 mm. In some embodiments, the roofing shingle 10 has a thickness of 2 mm to 6 mm. In some embodiments, the roofing shingle 10 has a thickness of 2 mm to 5 mm. In some embodiments, the roofing shingle 10 has a thickness of 2 mm to 4 mm. In some embodiments, the roofing shingle 10 has a thickness of 2 mm to 3 mm. In some embodiments, the roofing shingle 10 has a thickness of 3 mm to 10 mm. In some embodiments, the roofing shingle 10 has a thickness of 3 mm to 9 mm. In some embodiments, the roofing shingle 10 has a thickness of 3 mm to 8 mm. In some embodiments, the roofing shingle 10 has a thickness of 3 mm to 7 mm. In some embodiments, the roofing shingle 10 has a thickness of 3 mm to 6 mm. In some embodiments, the roofing shingle 10 has a thickness of 3 mm to 5 mm. In some embodiments, the roofing shingle 10 has a thickness of 3 mm to 4 mm. In some embodiments, the roofing shingle 10 has a thickness of 4 mm to 10 mm. In some embodiments, the roofing shingle 10 has a thickness of 4 mm to 9 mm. In some embodiments, the roofing shingle 10 has a thickness of 4 mm to 8 mm. In some embodiments, the roofing shingle 10 has a thickness of 4 mm to 7 mm. In some embodiments, the roofing shingle 10 has a thickness of 4 mm to 6 mm. In some embodiments, the roofing shingle 10 has a thickness of 4 mm to 5 mm.

In some embodiments, the roofing shingle 10 has a thickness of 5 mm to 10 mm. In some embodiments, the roofing shingle 10 has a thickness of 5 mm to 9 mm. In some embodiments, the roofing shingle 10 has a thickness of 5 mm to 8 mm. In some embodiments, the roofing shingle 10 has a thickness of 5 mm to 7 mm. In some embodiments, the roofing shingle 10 has a thickness of 5 mm to 6 mm. In some embodiments, the roofing shingle 10 has a thickness of 6 mm to 10 mm. In some embodiments, the roofing shingle 10 has a thickness of 6 mm to 9 mm. In some embodiments, the roofing shingle 10 has a thickness of 6 mm to 8 mm. In some embodiments, the roofing shingle 10 has a thickness of 6 mm to 7 mm. In some embodiments, the roofing shingle 10 has a thickness of 7 mm to 10 mm. In some embodiments, the roofing shingle 10 has a thickness of 7 mm to 9 mm. In some embodiments, the roofing shingle 10 has a thickness of 7 mm to 8 mm. In some embodiments, the roofing shingle 10 has a thickness of 8 mm to 10 mm. In some embodiments, the roofing shingle 10 has a thickness of 8 mm to 9 mm. In some embodiments, the roofing shingle 10 has a thickness of 9 mm to 10 mm.

In some embodiments, the roofing shingle 10 has a thickness of 0.2 mm. In some embodiments, the roofing shingle 10 has a thickness of 1 mm. In some embodiments, the roofing shingle 10 has a thickness of 2 mm. In some embodiments, the roofing shingle 10 has a thickness of 3 mm. In some embodiments, the roofing shingle 10 has a thickness of 4 mm. In some embodiments, the roofing shingle 10 has a thickness of 5 mm. In some embodiments, the roofing shingle 10 has a thickness of 6 mm. In some embodiments, the roofing shingle 10 has a thickness of 7 mm. In some embodiments, the roofing shingle 10 has a thickness of 8 mm. In some embodiments, the roofing shingle 10 has a thickness of 9 mm. In some embodiments, the roofing shingle 10 has a thickness of 10 mm.

In some embodiments, the roofing shingle 10 includes a structure, composition, components, and/or function similar to those of one or more embodiments of the photovoltaic modules disclosed in U.S. Patent Application Publication No. 2022/0393637, published Dec. 8, 2022, entitled "Roofing Module System," owned by GAF Energy LLC, the contents of which are incorporated by reference herein in its entirety.

Figure 3:
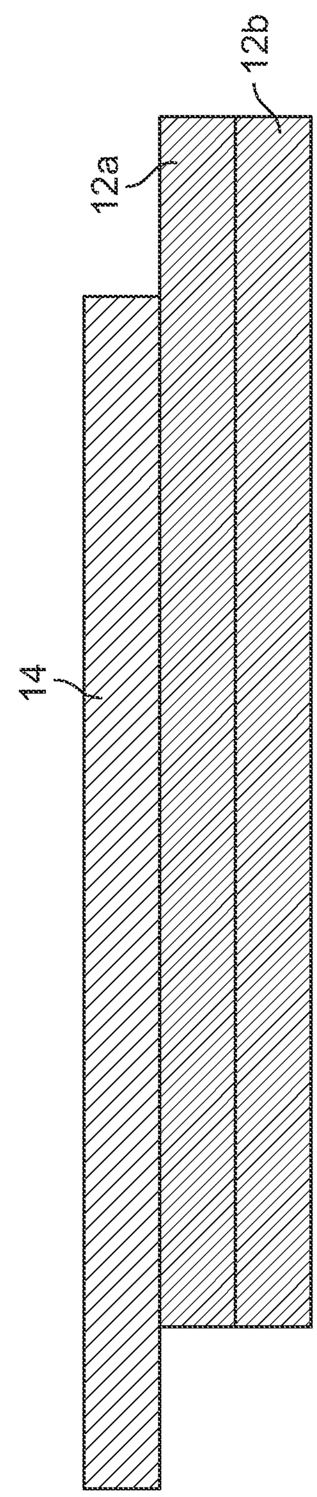
FIG. 3 is a side elevational view of some embodiments of a roofing shingle.

Referring to FIG. 3, in some embodiments, the roofing shingle 10 includes a first core layer 12*a* and a second core layer 12*b*. In some embodiments, the first core layer 12*a* is juxtaposed with the cap layer 14. In some embodiments, the second core layer 12*b* is juxtaposed with the first core layer 12*a*. In some embodiments, the first core layer 12*a* and the second core layer 12*b* are welded to one another. In some embodiments, the first core layer 12*a* and the second core layer 12*b* are ultrasonically welded to one another. In some embodiments, the first core layer 12*a* and the second core layer 12*b* are heat welded to one another. In some embodiments, the first core layer 12*a* and the second core layer 12*b* are thermally bonded to one another. In some embodiments, the first core layer 12*a* and the second core layer 12*b* are adhered to one another by an adhesive. In some embodiments, the first core layer 12*a* and the second core layer 12*b* are laminated. In some embodiments, the first core layer 12*a* and the second core layer 12*b* are co-extruded. In some embodiments, the first core layer 12*a* and the second core layer 12*b* are mechanically attached to one another. In some embodiments, the first core layer 12*a* and the second core layer 12*b* are attached to one another by at least one fastener. In some embodiments, the first core layer 12*a* and the second core layer 12*b* are attached to one another by a plurality of fasteners. In some embodiments, the first core layer 12*a* and the second core layer 12*b* are attached to one another by deforming one of the first core layer 12*a* and the second core layer 12*b* into the other one of the first core layer 12*a* and the second core layer 12*b*. In some embodiments, the first core layer 12*a* and the second core layer 12*b* are attached to one another by deforming a portion of one of the first core layer 12*a* and the second core layer 12*b* into the other one of the first core layer 12*a* and the second core layer 12*b*. In some embodiments, the first core layer 12*a* and the second core layer 12*b* are attached to one another by forming at least one hole in one or both of the first core layer 12*a* and the second core layer 12*b* and dispensing molten material into the at least one hole to connect the first core layer 12*a* and the second core layer 12*b*. In some embodiments, non-limiting examples of fasteners, fastening means and methods for fastening, connecting and attaching the first core layer 12*a* to the second core layer 12*b* are disclosed in U.S. Pat. No. 7,833,371 to Binkley et al, U.S. Pat. No. 8,006,457 to Binkley et al, U.S. Pat. No. 8,127,514 to Binkley et al, and U.S. Pat. No. 8,316,608 to Binkley et al, each of which is incorporated by reference herein in its entirety.

Figure 4:
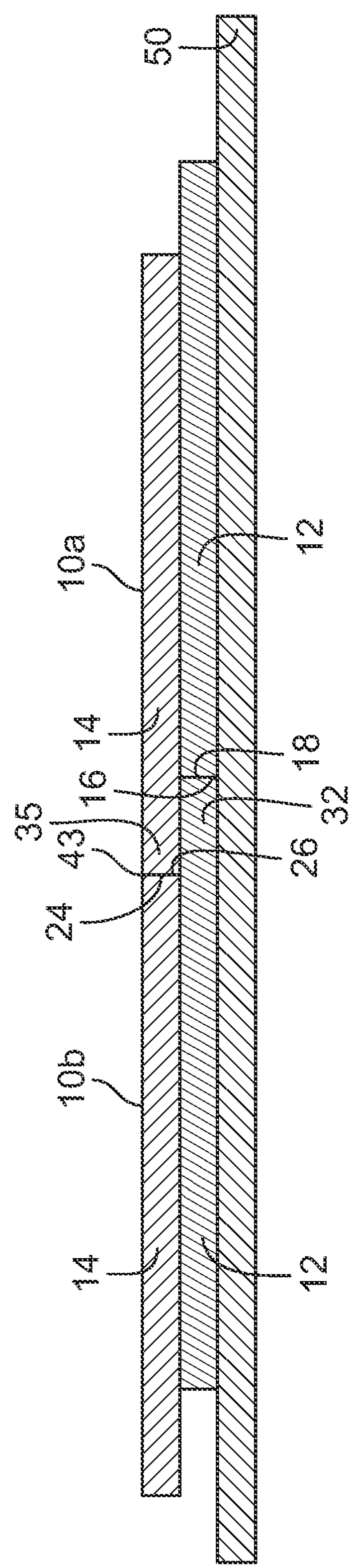
FIG. 4 is a side elevational view of some embodiments of a plurality of the roofing shingles shown in FIG. 1.

Referring to FIG. 4, in some embodiments, a plurality of the roofing shingles 10 is installed on a roof deck 50. In some embodiments, the extended portion 35 of a first one 10*a* of the roofing shingles 10 overlays the side lap 32 of a second one 10*b* of the roofing shingles 10. In some embodiments, the first end 16 of the core layer 12 of the first roofing shingle 10*a* is juxtaposed with the second end 18 of the core layer 12 of the second roofing shingle 10*b*. In some embodiments, the first end 24 of the cap layer 14 of the first roofing shingle 10*a* is juxtaposed with the second end 26 of the cap layer 14 of the second roofing shingle 10*b*. In some embodiments, a seam 43 is located between the first end 24 of the cap layer 14 of the first roofing shingle 10*a* and the second end 26 of the cap layer 14 of the second roofing shingle 10*b*. In some embodiments, the seam 43 is sealed. In some embodiments, the seam 43 is sealed with a sealant. In some embodiments, the seam 43 is sealed with an adhesive sealant. In some embodiments, the seam 43 is sealed with tape. In some embodiments, the tape is butyl tape.

Figure 5:
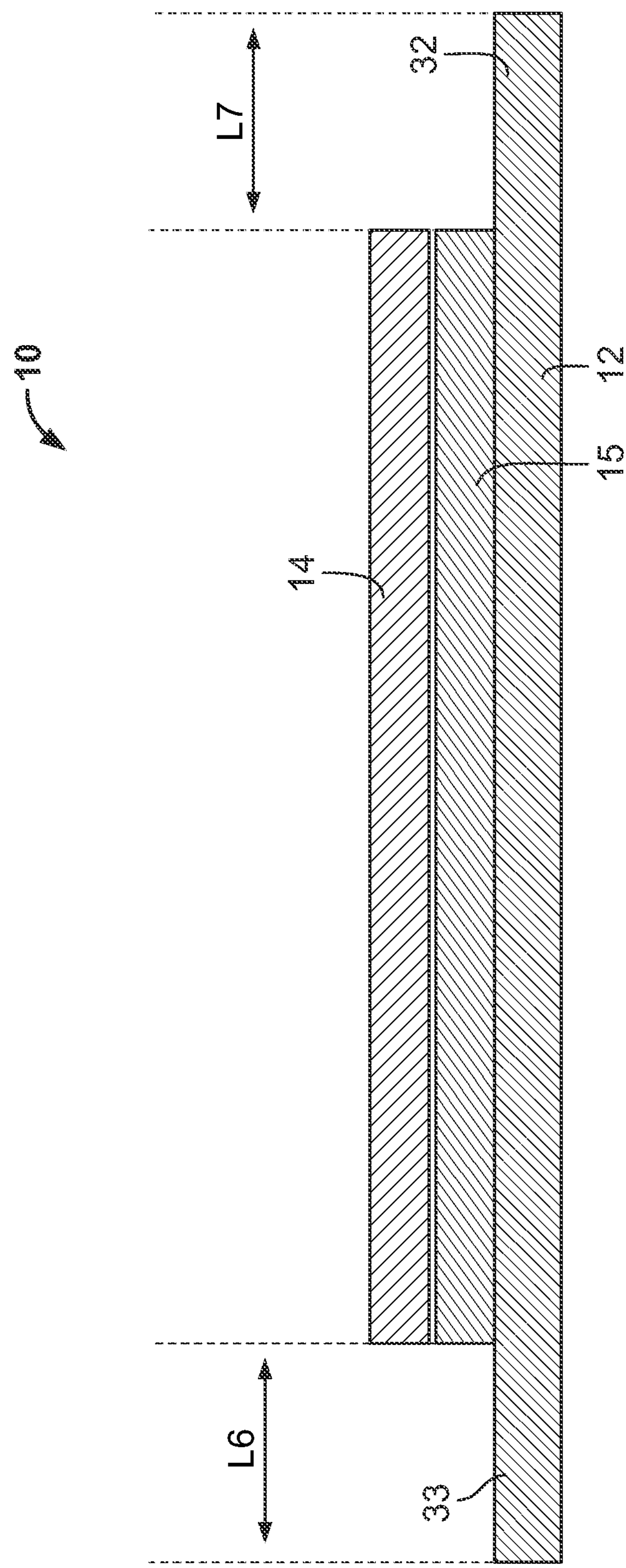
FIG. 5 is a side elevational view of embodiments of a roofing shingle.

Referring to FIG. 5, in some embodiments, an offset of the core layer 12 from the cap layer 14 forms the side lap 32 and a side lap 33. In some embodiments, the first end 16 of the core layer 12 is offset from the first end 24 of the cap layer 14. In some embodiments, the first end 16 of the core layer 12 extends outwardly relative to the first end 24 of the cap layer 14. In some embodiments, the second end 18 of the core layer 12 is offset from the second end 26 of the cap layer 14. In some embodiments, the second end 18 of the core layer 12 extends outwardly relative to the second end 26 of the cap layer 14. In some embodiments, the first end 16 of the core layer 12 is offset from the first end 24 of the cap layer 14 by a length L6. In some embodiments, the second end 18 of the core layer 12 is offset from the second end 26 of the cap layer 14 by a length L7. In some embodiments, the length L6 is 1 inch to 10 inches. In some embodiments, the length L7 is 1 inch to 10 inches. In some embodiments, the length L6 and the length L7 may each be in the same ranges as described above for the length L2.

Figure 6:
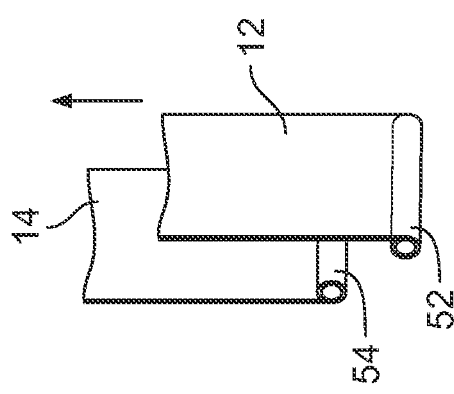
FIG. 6 illustrates some embodiments of a method of manufacturing the roofing shingle shown in FIG. 1.

FIG. 6 illustrates some embodiments of manufacturing the roofing shingle 10. In some embodiments, the roofing shingle 10 is processed by a roll-to-roll (R2R) process. In some embodiments, the core layer 12 is driven by a first roller 52 and the cap layer 14 is driven by a second roller 54. In some embodiments, a longitudinal axis of the first roller 52 is parallel with a longitudinal axis of the second roller 54. In some embodiments, a longitudinal axis of the first roller 52 is substantially parallel with a longitudinal axis of the second roller 54. In some embodiments, the first roller 52 is offset from the second roller 54. In some embodiments, the first roller 52 is offset from the second roller 54 by the length L1. In some embodiments, the core layer 12 and the cap layer 14 are simultaneously and continuously driven in a machine direction by the respective first and second rolls 52, 54. In some embodiments, the cap layer 14 is attached to the core layer 14 in an area A. In some embodiments, the core layer 12 and the cap layer 14 are welded to one another. In some embodiments, the core layer 12 and the cap layer 14 are ultrasonically welded to one another. In some embodiments, the core layer 12 and the cap layer 14 are heat welded to one another. In some embodiments, the core layer 12 and the cap layer 14 are thermally bonded to one another. In some embodiments, the core layer 12 and the cap layer 14 are adhered to one another by an adhesive. In some embodiments, the core layer 12 and the cap layer 14 are laminated. In some embodiments, the core layer 12 and the cap layer 14 are mechanically attached to one another. In some embodiments, the core layer 12 and the cap layer 14 are attached to one another by at least one fastener. In some embodiments, the core layer 12 and the cap layer 14 are attached to one another by a plurality of fasteners. In some embodiments, the core layer 12 and the cap layer 14 are attached to one another by deforming one of the core layer 12 and the cap layer 14 into the other one of the core layer 12 and the cap layer 14. In some embodiments, the core layer 12 and the cap layer 14 are attached to one another by deforming a portion of one of the core layer 12 and the cap layer 14 into the other one of the core layer 12 and the cap layer 14. In some embodiments, the core layer 12 and the cap layer 14 are attached to one another by forming at least one hole in one or both of the core layer 12 and the cap layer 14 and dispensing molten material into the at least one hole to connect the core layer 12 and the cap layer 14. In some embodiments, non-limiting examples of fasteners, fastening means and methods for fastening, connecting and attaching the core layer 12 and the cap layer 14 are disclosed in U.S. Pat. No. 7,833,371 to Binkley et al, U.S. Pat. No. 8,006,457 to Binkley et al, U.S. Pat. No. 8,127,514 to Binkley et al, and U.S. Pat. No. 8,316,608 to Binkley et al, each of which is incorporated by reference herein in its entirety.

Figure 7A:
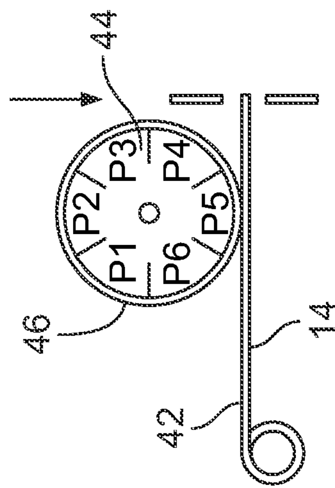
FIGS. 7A and 7B illustrate some embodiments of a pattern roller.
Figure 8:
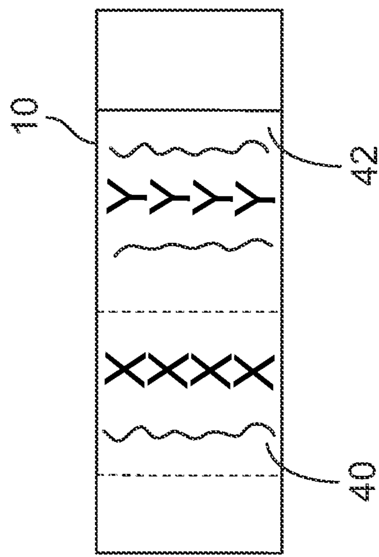
FIG. 8 illustrates some embodiments of the roofing shingle shown in FIG. 1 including a pattern.
Figure 7B:
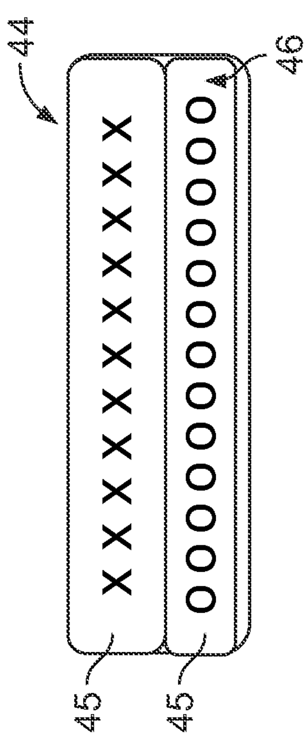

Referring to FIGS. 7A, 7B and 8, in some embodiments, a pattern 40 is formed on a first surface 42 of the cap layer 14. In some embodiments, the pattern 40 is formed on the first surface 42 of reveal portion 38 of the cap layer 14. In some embodiments, when the roofing shingle 10 is installed on the roof deck 50 of a structure, the pattern 40 is viewable from the vantage point of an individual located at a ground level of the structure.

Figure 12:
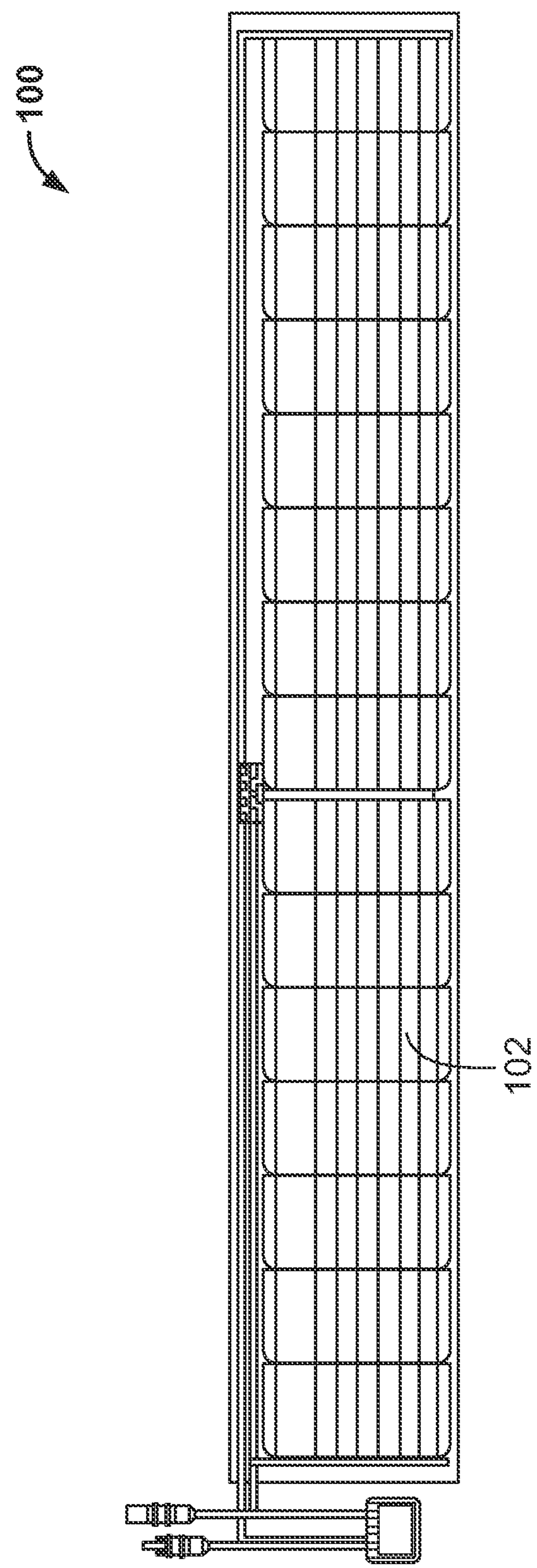
FIG. 12 illustrates some embodiments of a photovoltaic module.

In some embodiments, the first surface 42 of the roofing shingle 10 is textured. In some embodiments, the first surface 42 of the roofing shingle 10 is textured to impart an appearance of a traditional asphalt roofing shingle. In some embodiments, the first surface 42 of the roofing shingle 10 is textured to impart an appearance of and aesthetically match a photovoltaic module 100 (see FIG. 12). In some embodiments, the photovoltaic module 100 includes at least one solar cell 102. In some embodiments, the photovoltaic module 100 includes a plurality of the solar cells 102. In some embodiments, the photovoltaic module 100 includes a structure, composition, components, and/or function similar to those of one or more embodiments of the photovoltaic modules disclosed in PCT International Patent Publication No. WO 2022/051593, Application No. PCT/US2021/049017, published Mar. 10, 2022, entitled "Building Integrated Photovoltaic System," owned by GAF Energy LLC, the contents of which are incorporated by reference herein in its entirety.

In some embodiments, the first surface 42 is an embossed surface. In some embodiments, the pattern 40 on the first surface 42 includes a plurality of indentations. In some embodiment, each of the plurality of indentations has a circular shape. In some embodiment, each of the plurality of indentations has a rectangular shape. In some embodiments, each of the plurality of indentations has a square shape. In some embodiments, each of the plurality of indentations has a triangular shape. In some embodiments, each of the plurality of indentations has an elliptical shape. In some embodiments, each of the plurality of indentations has an oval shape. In some embodiments, each of the plurality of indentations has a rhombus shape. In some embodiments, each of the plurality of indentations has a hexagonal shape. In some embodiments, each of the plurality of indentations includes a pentagonal shape. In some embodiments, each of the plurality of indentations has a polygonal shape. In some embodiments, each of the plurality of indentations has a non-polygonal shape. In some embodiments, each of the plurality of indentations has a geometric shape. In some embodiments, each of the plurality of indentations has a non-geometric shape. In some embodiments, the pattern 40 on the first surface 42 includes a plurality of dimples. In some embodiments, the indentations are created by embossing a portion of the first surface 42. In some embodiments, the texture includes a surface roughness (Ra). In some embodiments, the surface roughness (Ra) is 1 micron to 200 microns. In some embodiments, the pattern 40 on the first surface 42 includes a plurality of lines. In some embodiments, the pattern 40 on the first surface 42 includes a plurality of grooves. In some embodiments, the pattern 40 on the first surface 42 includes cross-hatches.

In some embodiments, a pattern roller 44 forms the pattern 40 on the first surface 42 of the cap layer 14. In some embodiments, the pattern roller 44 includes a circumferential face 46. In some embodiments, the face 46 includes at least one pattern. In some embodiments, the at least one pattern includes a plurality of patterns. In some embodiments, the plurality of patterns are strips 45 along a length of the roller 44 in a longitudinal direction. In some embodiments, the plurality of patterns includes at least two patterns. In some embodiments, the plurality of patterns includes at least three patterns. In some embodiments, the plurality of patterns includes at least four patterns. In some embodiments, the plurality of patterns includes at least five patterns. In some embodiments, the plurality of patterns includes at least six patterns. In some embodiments, each of the plurality of patterns is identical to one another. In some embodiments, each of the plurality of patterns is different from one another. In some embodiments, at least one of the plurality of patterns is different from at least another one of the patterns. In some embodiments, at least one of the plurality of patterns is similar to at least another one of the patterns. In some embodiments, the pattern roller 44 has a circumference of 68.5 inches and a diameter of 21.8 inches. In some embodiments, the pattern roller 44 includes four patterns. In some embodiments, each of the patterns extends for 17-⅛ inches along the circumference of the pattern roller 44. In some embodiments, the pattern roller 44 has a greater or lower circumference than 68.5 inches and a corresponding lower or greater diameter.

In some embodiments, the pattern 40 is formed simultaneously with the processing of the core layer 12 and the cap layer 14 of the roofing shingle 10. In some embodiments, the pattern 40 processed during a roll-to-roll (R2R) process of the core layer 12 and the cap layer 14.

In some embodiments, the pattern is printed on the first surface 42 of the cap layer 14. In some embodiments, a pattern or depiction of solar cells is printed on the first surface 42 of the cap layer 14. In some embodiments, each of the depicted solar cells has a width of 5 inches to 8 inches. In some embodiments, the pattern is printed on the first surface 42 of the cap layer 14 by ink jet printing. In some embodiments, the pattern is printed on the first surface 42 of the cap layer 14 by laser printing. In some embodiments, the pattern is printed on the first surface 42 of the cap layer 14 by lithography. In some embodiments, the pattern is printed on the first surface 42 of the cap layer 14 by flexography. In another embodiment, the cap layer 14 is painted. In another embodiment, the cap layer 14 is a colored layer. In another embodiment, the cap layer 14 includes a black color. In some embodiments, the color of the cap layer 14 includes a mixture of colors. In some embodiments, the cap layer 14 includes an infrared reflective pigment. In some embodiments, the infrared reflective pigment includes graphene. In some embodiments, the roofing shingle 10 meets standards of California Building Energy Efficiency Standards of Residential and Nonresidential Buildings, Title 24, Part 6.

In some embodiments, the cap layer 14 includes magnesium oxide (MgO). In some embodiments, the cap layer 14 includes 35% to 50% by weight of MgO. In some embodiments, the cap layer 14 includes 35% to 45% by weight of MgO. In some embodiments, the cap layer 14 includes 35% to 40% by weight of MgO. In some embodiments, the cap layer 14 includes 40% to 50% by weight of MgO. In some embodiments, the cap layer 14 includes 40% to 45% by weight of MgO. In some embodiments, the cap layer 14 includes 45% to 50% by weight of MgO. In some embodiments, the cap layer 14 includes 35% by weight of MgO. In some embodiments, the cap layer 14 includes 40% by weight of MgO. In some embodiments, the cap layer 14 includes 45% by weight of MgO. In some embodiments, the cap layer 14 includes 50% by weight of MgO.

In some embodiments, the cap layer 14 includes ketone ethylene ester (KEE) In some embodiments, the cap layer 14 includes a PVC-KEE hybrid membrane. In some embodiments, the roofing shingle 10 is adapted to be a component of a photovoltaic system that includes a fire resistance that conforms to standards under UL 790/ASTM E 108 test standards. In some embodiments, the roofing shingle 10 includes a Class A rating when tested in accordance with UL 790/ASTM E 108.

Figure 9:
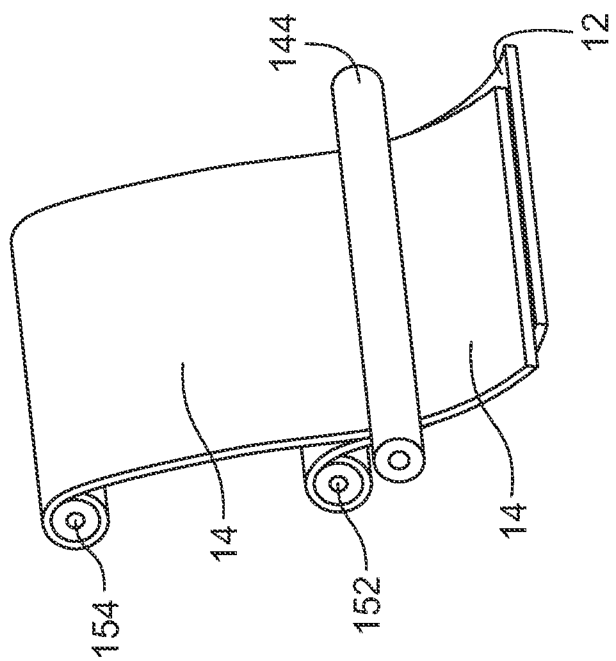
FIG. 9 illustrates some embodiments of a method of manufacturing a roofing shingle.

FIG. 9 illustrates some embodiments of manufacturing the roofing shingle 10. In some embodiments, the core layer 12 is driven by a bottom infeed roller 152 and the cap layer 14 is driven by a top infeed roller 154. In some embodiments, a longitudinal axis of the bottom infeed roller 152 is parallel with a longitudinal axis of the top infeed roller 154. In some embodiments, a longitudinal axis of the bottom infeed roller 152 is substantially parallel with a longitudinal axis of the top infeed roller 154. In some embodiments, the bottom infeed roller 152 is offset from the top infeed roller 154. In some embodiments, the top infeed roller 154 is offset from the bottom infeed roller 152 by the length L1 in a direction along the longitudinal axis of the bottom infeed roller 152. In some embodiments, the core layer 12 and the cap layer 14 are simultaneously and continuously driven in a machine direction by the respective one of the bottom infeed roller 152 and the top infeed roller 154. In some embodiments, a pattern roller 144 is located proximate to the bottom infeed roller 152. In some embodiments, the pattern 40 is formed simultaneously with the processing of the core layer 12 and the cap layer 14 of the roofing shingle 10.

Figure 10:
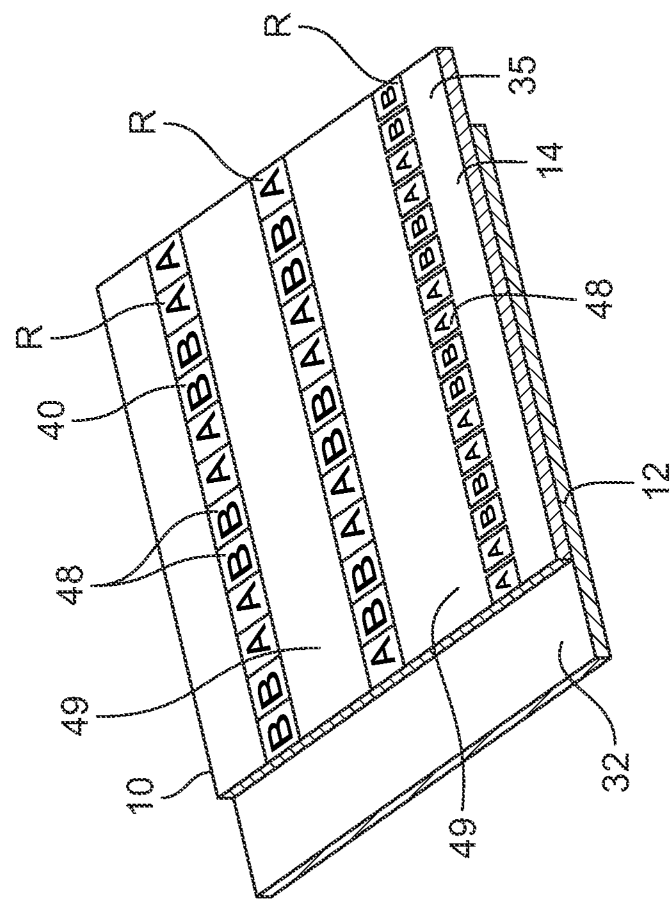
FIG. 10 illustrates some embodiments of the roofing shingle including a pattern.

Referring to FIG. 10, in some embodiments, the pattern 40 includes at least one row R of a depiction of a plurality of solar cells 48. In some embodiments, the at least one row R includes a plurality of the rows R. In some embodiments, each of the rows R extends from the first end 24 to the second end 26 of the cap layer 14. In some embodiments, the depiction of the solar cells 48 includes at least one first cell A and at least one second cell B. In some embodiments, the at least one first cell A includes a plurality of the first cells A. In some embodiments, the at least one second cell B includes a plurality of the second cells B. In some embodiments, each of the cells A has a first color. In some embodiments, each of the cells B has a second color. In some embodiments, the second color is darker than the first color. In some embodiments, the second color is lighter than the first color. In some embodiments, each of the rows R has a repeating pattern of a pair of the first cells A and a pair of the second cells B (e.g., AABBAABB . . . ). In some embodiments, each of the rows R has a repeating pattern of a first cell A and a second cell B (e.g., ABABAB . . . ). In some embodiments, each of the rows R has a repeating pattern of three of the first cell A and three of the second cell B (e.g., AAABBBAAABBB . . . ). In some embodiments, each of the rows R has a repeating pattern of more than three of the first cell A and more than three of the second cell B (e.g., AAAABBBBAAAABBBB . . . ; AAAAABBBB-BAAAAABBBBB . . . etc.). In some embodiments, each of the rows R are spaced apart from one another. In some embodiments, at least one smooth portion 49 is located between a corresponding pair of the rows R. In some embodiments, the at least one smooth portion 49 includes a plurality of the smooth portions 49. In some embodiments, the at least one smooth portion 49 extends from the first end 24 to the second end 26 of the cap layer 14.

Figure 11:
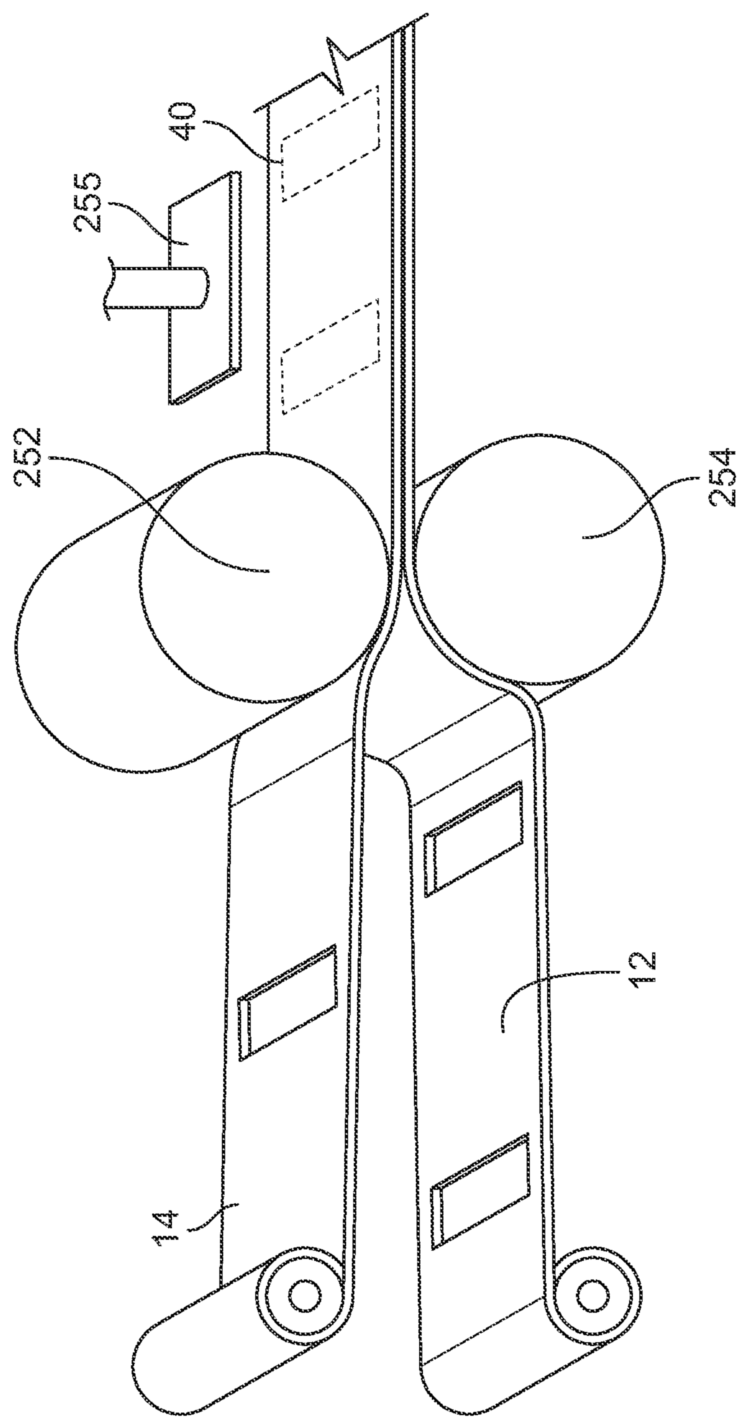
FIG. 11 illustrates some embodiments of a method of manufacturing a roofing shingle.

FIG. 11 illustrates some embodiments of manufacturing the roofing shingle 10. In some embodiments, the core layer 12 is driven by a first infeed roller 252 and the cap layer 14 is driven by a second infeed roller 254. In some embodiments, a longitudinal axis of the first infeed roller 252 is parallel with a longitudinal axis of the second infeed roller 254. In some embodiments, a longitudinal axis of the first infeed roller 252 is substantially parallel with a longitudinal axis of the second infeed roller 254. In some embodiments, the first infeed roller 252 is offset from the second infeed roller 254. In some embodiments, the first infeed roller 252 is offset from the second infeed roller 254 by the length L1 in a direction along the longitudinal axis of the second infeed roller 254. In some embodiments, the core layer 12 and the cap layer 14 are simultaneously and continuously driven in a machine direction by the respective one of the first infeed roller 252 and the second infeed roller 254. In some embodiments, the pattern 40 is formed simultaneously with the processing of the core layer 12 and the cap layer 14 of the roofing shingle 10. In some embodiments, the pattern 40 is formed by a press die 255. In some embodiments, the press die 255 is located downstream from the rollers 252, 254. In some embodiments, the pattern 40 is stamped within the cap layer 14 by the press die 255. In some embodiments, the pattern 40 is stamped on the cap layer 14 by the press die 255.

In some embodiments, a roofing system includes at least one of the roofing shingle 10 and at least one photovoltaic module 100. In some embodiments, the at least one of the roofing shingle 10 includes a plurality of roofing shingles 10. In some embodiments, the at least one photovoltaic module 100 includes a plurality of photovoltaic modules 100. In some embodiments, the at least one photovoltaic module 100 is electrically active. In some embodiments, the system includes at least one roofing shingle 10 and at least one electrically active photovoltaic module 100. In some embodiments, the system includes at least one roofing shingle 10, at least one electrically active photovoltaic module 100, and at least one nonactive photovoltaic module 100. In some embodiments, the at least one roofing shingle 10 and the at least one photovoltaic module 100 are installed on a roof deck. In some embodiments, the appearance of the at least one roofing shingle 10 aesthetically matches the appearance of the at least one photovoltaic module 100. As used herein, the term "aesthetically matches" means having a similar overall visual appearance, texture, gloss, and/or color, and with respect to an embodiment of the roofing shingle 10, the roofing shingle 10 includes a visual appearance, texture, gloss, and/or color that is similar to those of the photovoltaic module 100. In some embodiments, the color is measured under a CIELAB color space system. In some embodiments, the gloss can be quantified in accordance with the ASTM E430 Standard Test Methods for Measurement of Gloss of High-Gloss Surfaces by Abridged Goniophotometry. In some embodiments, the appearance of each of the roofing shingle 10 and the photovoltaic module 100 are visually perceptible by and subjective to a human.

In some embodiments, the roofing shingle 10 is cuttable. In some embodiments, the roofing shingle 10 is cuttable to a desired size and shape. As used herein, the term "cuttable" means capable of being cut or penetrated with or as if with by an edged instrument, and with respect to certain embodiments of the roofing shingle 10, the roofing shingle 10 is capable of being cut or penetrated by am edged instrument such as a cutting knife, scissors, razor, or other suitable roofing module cutting instruments and tools. In some embodiments, the roofing shingle 10 is configured to be installed on the roof deck 50. In some embodiments, the roofing shingle 10 is configured to be installed on non-solar roof planes of the roof deck 50. In some embodiments, the roofing shingle 10 is configured to be installed either partially or fully around an array of the photovoltaic modules 100. In some embodiments, the roofing shingle 10 is cuttable to a size and shape for positioning around obstacles, such as vents, chimneys, antennas, and other roofing structures. In some embodiments, the roofing shingle 10 cuttable to a size and shape to extend to roofing eaves and ridges.

In some embodiments, a method includes the steps of:

obtaining a plurality of the roofing shingles 10;

obtaining a plurality of photovoltaic modules 100, each of the plurality of photovoltaic modules 100 includes at least one solar cell;

installing the plurality of photovoltaic modules 100 on the roof deck 50;

installing the plurality of roofing shingles 10 on the roof deck 50 proximate to the plurality of photovoltaic modules 100, such that the extended portion 35 of the first roofing shingle 10*a* of the plurality of roofing shingles 10 overlays the side lap 32 of the second roofing shingle 10*b* of the plurality of roofing shingles 10, each of the roofing shingles 10*a*, 10*b* aesthetically matches the photovoltaic modules 100.

In some embodiments, a method includes the steps of:

obtaining the core layer 12 of a first material;

obtaining the cap layer 14 of a second material;

positioning the second end 26 of the cap layer 14 offset from the second end 18 of the core layer 12 and positioning the first end 24 of the cap layer 14 offset from the first end 16 of the core layer 12;

overlaying the cap layer 14 over the core layer 12; and attaching the cap layer 14 to the core layer 12 to form at least one of the roofing shingle 10.

What is claimed is:

1. A system, comprising:

a plurality of roofing shingles installed on a roof deck, each of the roofing shingles includes a core layer having a first end, a second end opposite the first end, and an upper edge extending from the first end to the second end, wherein the core layer is composed of a polymeric material, and a cap layer overlaying the core layer, wherein the cap layer is composed of the polymeric material, wherein the cap layer includes a first end, a second end opposite the first end of the cap layer, and an upper edge extending from the first end of the cap layer to the second end of the cap layer, wherein the upper edge of the cap layer is substantially aligned with the upper edge of the core layer, wherein the second end of the cap layer is offset from the second end of the core layer, wherein the first end of the cap layer is offset from the first end of the core layer, wherein the cap layer includes a first surface and a pattern on the first surface, wherein the pattern includes a depiction of a plurality of solar cells, a side lap extending from the second end of the cap layer to the second end of the core layer, an extended portion at the first end of the cap layer, wherein the extended portion of a first one of the roofing shingles overlays the side lap of a second one of the roofing shingles; and a plurality of photovoltaic modules, each of the plurality of photovoltaic modules include at least one solar cell.

2. The system of claim 1, wherein the second end of the cap layer is offset from the second end of the core layer by 1 inch to 10 inches.

3. The system of claim 1, wherein the polymeric material is thermoplastic polyolefin (TPO).

4. The system of claim 1, wherein the cap layer is welded to the core layer.

5. The system of claim 1, wherein the cap layer is adhered to the core layer by an adhesive.

6. The system of claim 1, wherein the depiction of a plurality of solar cells includes at least one row of the depiction of a plurality of solar cells, wherein the depiction of a plurality of solar cells in a first row of the at least one row includes a first plurality of solar cells, wherein each of the first plurality of solar cells has a first color, and a second plurality of solar cells, wherein each of the second plurality of solar cells has a second color, wherein the first color is different from the second color.

7. The system of claim 6, wherein the pattern includes at least two consecutive solar cells of the first plurality of solar cells and at least two consecutive solar cells of the second plurality of solar cells.

8. The system of claim 7, wherein the pattern includes at least three consecutive solar cells of the first plurality of solar cells and at least three consecutive solar cells of the second plurality of solar cells.

9. The system of claim 8, wherein the pattern includes at least four consecutive solar cells of the first plurality of solar cells and at least four consecutive solar cells of the second plurality of solar cells.

10. The system of claim 6, wherein the at least one row includes a plurality of rows, wherein the depiction of a plurality of solar cells in a second row of the plurality of rows includes a third plurality of solar cells, wherein each of the third plurality of solar cells has a third color, and a fourth plurality of solar cells, wherein each if the fourth plurality of solar cells has a fourth color, wherein the third color is different from the fourth color.

11. The system of claim 10, wherein the third color is the same as the first color, and wherein the fourth color is the same as the second color.

12. The system of claim 11, wherein the first row extends from the first end of the cap to the second end of the cap, and wherein the second row extends from the first end of the cap to the second end of the cap, wherein the first row of the first one of the roofing shingles is substantially aligned with the first row of the second one of roofing shingles, and wherein the second row of the first one of the roofing shingles is substantially aligned with the second row of the second one of roofing shingles.

13. A roofing shingle, comprising:

a core layer having a first end, a second end opposite the first end, and an upper edge extending from the first end to the second end, wherein the core layer is composed of a polymeric material;

a cap layer overlaying the core layer, wherein the cap layer is composed of the polymeric material, wherein the cap layer includes a first end, a second end opposite the first end of the cap layer, and an upper edge extending from the first end of the cap layer to the second end of the cap layer, wherein the upper edge of the cap layer is substantially aligned with the upper edge of the core layer, wherein the second end of the cap layer is offset from the second end of the core layer, wherein the first end of the cap layer is offset from the first end of the core layer, wherein the cap layer includes a first surface and a pattern on the first surface, wherein the pattern includes a depiction of a plurality of solar cells, a side lap extending from the second end of the cap layer to the second end of the core layer; and an extended portion at the first end of the cap layer, wherein the extended portion of the roofing shingle is configured to overlay a side lap of another one of the roofing shingles, and wherein the roofing shingle is configured to be installed on a roof deck.

14. The roofing shingle of claim 13, wherein the second end of the cap layer is offset from the second end of the core layer by 1 inch to 10 inches.

15. The roofing shingle of claim 13, wherein the polymeric material is thermoplastic polyolefin (TPO).

16. The roofing shingle of claim 13, wherein the cap layer is welded to the core layer.

17. The roofing shingle of claim 13, wherein the cap layer is adhered to the core layer by an adhesive.

18. A method, comprising the steps of:

obtaining a plurality of roofing shingles, each of the roofing shingles includes a core layer having a first end, and a second end opposite the first end, and an upper edge extending from the first end to the second end, wherein the core layer is composed of a polymeric material, a cap layer overlaying the core layer, wherein the cap layer is composed of the polymeric material, wherein the cap layer includes a first end, a second end opposite the first end of the cap layer, and an upper edge extending from the first end of the cap layer to the second end of the cap layer, wherein the upper edge of the cap layer substantially aligned with the upper edge of the core layer, wherein the second end of the cap layer is offset from the second end of the core layer, wherein the first end of the cap layer is offset from the first end of the core layer, wherein the cap layer includes a first surface and a pattern on the first surface, wherein the pattern includes a depiction of a plurality of solar cells, a side lap extending from the second end of the cap layer to the second end of the core layer, and an extended portion at the first end of the cap layer;

obtaining a plurality of photovoltaic modules, each of the plurality of photovoltaic modules includes at least one solar cell, installing the plurality of photovoltaic modules on a roof deck;

installing the plurality of roofing modules on the roof deck proximate to the plurality of photovoltaic modules, and wherein the extended portion of a first roofing shingle of the plurality of roofing shingles overlays the side lap of a second roofing shingle of the plurality of roofing shingles.

19. A method, comprising the steps of:

obtaining a core layer of a first material, wherein the first material includes a polymeric material, wherein the core layer includes a first end, a second end opposite the first end, and an upper edge extending from the first end to the second end;

obtaining a cap layer of a second material, wherein the second material includes the polymeric material, wherein the cap layer includes a first end, a second end opposite the first end of the cap layer, and an upper edge extending from the first end of the cap layer to the second end of the cap layer, wherein the upper edge of the cap layer substantially aligned with the upper edge of the core layer;

positioning the second end of the cap layer offset from the second end of the core layer and positioning the first end of the cap layer offset from the first end of the core layer;

overlaying the cap layer over the core layer;

attaching the cap layer to the core layer to form at least one roofing shingle, wherein the at least one roofing shingle includes a side lap extending from the second end of the cap layer to the second end of the core layer, and wherein the at least one roofing shingle includes an extended portion at the first end of the cap layer, wherein the extended portion of a first roofing shingle of the at least one roofing shingle is configured to overlay the side lap of a second roofing shingle of the at least one roofing shingle; and creating a pattern on a surface of the cap layer simultaneous with the attaching the cap layer to the core layer, wherein the pattern includes a depiction of a plurality of solar cells.

20. The method of claim 19, wherein the overlaying step includes rolling the core layer by a first infeed roller and rolling the cap layer by a second infeed roller, wherein the first infeed roller is offset from the second infeed roller.

* * * * *